(12) United States Patent
Sullivan

(10) Patent No.: US 12,504,942 B2
(45) Date of Patent: Dec. 23, 2025

(54) APPARATUS FOR GENERATING AUDIO AND/OR PERFORMANCE SYNCHRONIZED OPTICAL OUTPUT, AND MUSICAL INSTRUMENT AND SYSTEMS THEREFOR

(71) Applicant: Steven Sullivan, Austin, TX (US)

(72) Inventor: Steven Sullivan, Austin, TX (US)

( * ) Notice: Subject to any disclaimer, the term of this patent is extended or adjusted under 35 U.S.C. 154(b) by 196 days.

(21) Appl. No.: 17/146,921

(22) Filed: Jan. 12, 2021

(65) Prior Publication Data

US 2021/0318847 A1  Oct. 14, 2021

Related U.S. Application Data

(60) Provisional application No. 63/009,097, filed on Apr. 13, 2020.

(51) Int. Cl.
*G06F 17/00* (2019.01)
*F21V 33/00* (2006.01)
(Continued)

(52) U.S. Cl.
CPC .......... *G06F 3/165* (2013.01); *F21V 33/0056* (2013.01); *G06F 3/04847* (2013.01);
(Continued)

(58) Field of Classification Search
CPC .................. H05B 47/105; G10L 25/51; G10H 2220/411; G10H 2220/066;
(Continued)

(56) References Cited

U.S. PATENT DOCUMENTS 4,107,462 A * 8/1978 Asija ...................... A63H 13/00
40/457
4,236,191 A * 11/1980 Martinez .............. G02B 6/0005
362/86
(Continued)

FOREIGN PATENT DOCUMENTS

CN 106531138 A 3/2017
CN 106875930 A 6/2017
(Continued)

OTHER PUBLICATIONS

Pask; Musicolour; 1968 (Year: 1968).*
(Continued)

*Primary Examiner* — Paul C Mccord
(74) *Attorney, Agent, or Firm* — HULSEY P.C.

(57) ABSTRACT

An apparatus for generating audio synchronized optical output is provided. The apparatus comprises an input channel to receive an input signal from an audio source and a controller. The controller is configured to receive the input signal from the input channel, analyze the input signal to determine one or more characteristics of the input signal. The apparatus associates the determined one or more characteristics of the input signal to one or more parameters of an optical output from an optical source and modulates the one or more parameters of the optical output in accordance with the one or more characteristics of the input signal. The system for generates real-time audio and/or performance synchronized optical outputs and enables connecting stage implements, musical instruments, lights, visual effects, lasers and other theatrical effects to be controllable by lighting data from human interactions with musical instruments or other stage or human interface devices.

17 Claims, 15 Drawing Sheets

(51) Int. Cl.
*G06F 3/04847* (2022.01)
*G06F 3/16* (2006.01)
*G10H 1/00* (2006.01)
*G10L 25/51* (2013.01)
*H05B 47/105* (2020.01)

(52) U.S. Cl.
CPC ........... *G10H 1/0008* (2013.01); *G10L 25/51* (2013.01); *H05B 47/105* (2020.01); *G10H 1/0066* (2013.01); *G10H 2210/066* (2013.01); *G10H 2210/076* (2013.01)

(58) Field of Classification Search
CPC ....... G10H 2210/076; G10H 2210/066; G10H 1/0066; G10H 1/0008; G06F 3/165; G06F 3/04847; F21V 33/0056
USPC .......................................................... 700/94
See application file for complete search history.

(56) References Cited

U.S. PATENT DOCUMENTS

| | | | | |
|---|---|---|---|---|
| 4,563,933 A * | 1/1986 | Kim | .......................... | G10D 3/00 84/267 |
| 4,809,584 A * | 3/1989 | Forrest | ..................... | A63J 17/00 362/811 |
| 5,017,770 A | 5/1991 | Sigalov | | |
| 5,990,411 A | 11/1999 | Kellar | | |
| 6,029,122 A * | 2/2000 | Hunt | ..................... | H05B 47/155 362/85 |
| 6,268,557 B1 | 7/2001 | Devecka | | |
| 6,417,439 B2 | 7/2002 | Uehara et al. | | |
| 6,689,947 B2 | 2/2004 | Ludwig | | |
| 6,696,631 B2 | 2/2004 | Smith et al. | | |
| 7,227,075 B2 | 6/2007 | Chang et al. | | |
| 7,501,571 B2 | 3/2009 | Forsman et al. | | |
| 7,754,960 B2 | 7/2010 | Yamamoto et al. | | |
| 7,786,371 B1 | 8/2010 | Moates | | |
| 8,017,858 B2 | 9/2011 | Mann | | |
| 8,115,091 B2 | 2/2012 | Brenner et al. | | |
| 8,835,739 B2 | 9/2014 | Bencar et al. | | |
| 8,901,405 B1 * | 12/2014 | McCarthy | ............ | G09B 15/003 84/478 |
| 9,018,507 B2 | 4/2015 | Tabata | | |
| 9,305,531 B2 | 4/2016 | Miwa | | |
| 9,460,695 B2 | 10/2016 | Szalay et al. | | |
| 9,514,728 B2 | 12/2016 | Maruyama et al. | | |
| 9,699,867 B2 | 7/2017 | Horist | | |
| 9,761,211 B2 | 9/2017 | Redding et al. | | |
| 10,234,956 B2 | 3/2019 | Shah et al. | | |
| 10,276,138 B2 | 4/2019 | Ludwig | | |
| 10,390,410 B2 | 8/2019 | Kawano et al. | | |
| 10,482,859 B1 | 11/2019 | Horban et al. | | |
| 2002/0038157 A1 * | 3/2002 | Dowling | .............. | H05B 47/155 700/90 |
| 2013/0236033 A1 | 9/2013 | Ayres et al. | | |
| 2015/0332660 A1 | 11/2015 | Adams et al. | | |
| 2017/0122616 A1 * | 5/2017 | Calabro | ................... | F24F 11/30 |
| 2018/0041681 A1 * | 2/2018 | Pope | ...................... | H04N 23/72 |
| 2018/0220505 A1 * | 8/2018 | Silverman | .............. | H05B 45/14 |
| 2018/0286365 A1 * | 10/2018 | Washington | ........ | F21V 23/0492 |
| 2021/0151016 A1 * | 5/2021 | Recchia | ................... | G10H 1/42 |

FOREIGN PATENT DOCUMENTS

| | | |
|---|---|---|
| CN | 109068439 A | 12/2018 |
| DE | 3902580 | 12/1991 |

OTHER PUBLICATIONS

ADJ; Mega Flash DMX; https://www.adj.com/mega-flash-dmx.
Amazon; LED Strip Lights Music; https://www.amazon.com/LED-Waterproof-RGB-Controller-DotStone/dp/B06Y15YVFN?ref=fsclp_pl_dp_1.
Amazon; LED Strip Lights Music; https://www.amazon.com/Tenmiro-Trichromatic-Changing-Non-Waterproof-Decoration/dp/B07H854Z6M?ref_=fsclp_pl_dp_2.
Avenue Sound; Avenue Sound; https://avenuesound.in/walkeshwar-apartment-adds-hidden-home-theater-an-automated-smart-glass-and-voice-activated-control/.
Avidia; How to enhance your home theater with smart lighting; https://avidiaonline.com/blog/how-to-enhance-your-home-theater-with-smart-lighting.
Electronic House; Voice Controlled Lighting: Why it Makes Sense for Your Home; https://www.electronichouse.com/home-lighting/voice-controlled-lighting-makes-sense-home/.
Enttec; DMXIS Software; https://www.enttec.com.au/product/lighting-communication-protocols/dmx512/dmxis.
Logic Integration; Home automation; https://www.logicav.net/, https://www.youtube.com/watch?v=CKIQxCqgkxU.
Medium; Audiovisual Live Performance; https://medium.com/@orthentix/midi-for-audiovisual-performance-5e7514251848.
Musictech; 12 best products for live performance; https://www.musictech.net/guides/buyers-guide/live-performance-product-guide/.
Philips; Discover the magic of voice activated lights from Philips Hue; https://www2.meethue.com/en-us/smart-voice-controlled-lights.
PSSL Prosound and Stage Lighting; SoundSwitch Automatic DMX Lighting Controller for Serato DJ; https://www.youtube.com/watch?v=VWO4oadwfX8.
Shih-Wen Hsiao, et al.; Methodology for Stage Lighting Control Based on Music Emotions; https://www.researchgate.net/publication/317046454_Methodology_for_Stage_Lighting_Control_Based_on_Music_Emotions; May 2017.
Uking; 500W Smoke Fog Machine RGB LED Stage Lighting Effect with Remote Control for Wedding DJ Bar Christmas Party Halloween; https://www.amazon.co.uk/Machine-Lighting-Control-Christmas-Halloween/dp/B07BS6N9H2.
Wirecutter; 3 Easy Ways to Use Alexa and Smart Lights to Enhance Your Home; https://www.nytimes.com/wirecutter/blog/use-alexa-smart-light-enhance-home/.
Wirepath Home Systems LLC; Smart Lighting; https://www.control4.com/solutions/smart-lighting/.

* cited by examiner

APPARATUS FOR GENERATING AUDIO AND/OR PERFORMANCE SYNCHRONIZED OPTICAL OUTPUT, AND MUSICAL INSTRUMENT AND SYSTEMS THEREFOR

The present application claims the benefit of U.S. Provisional Application No. 63/009,027, filed Apr. 13, 2020, all of which is incorporated herein by reference.

FIELD OF THE INVENTION

The present disclosure relates to musical performance systems, and more particularly to an apparatus for generating audio and/or performance synchronized visual effects. The present disclosure further provides a musical instrument or stage implement which generates real-time visual effects and lighting control information based upon characteristics of the user's performance or other inputs. The present disclosure further provides a system for generating real-time audio and/or performance synchronized optical outputs. The present disclosure further provides a system of connected stage implements, musical instruments, lights, visual effects, lasers and other theatrical effects which are controlled by lighting data generated in real-time by human interactions with musical instrument or other stage implement or another human interface device.

BACKGROUND OF THE INVENTION

With rapid digitization and improvements in the music industry, there is a desire for providing lighting effects in live performances, recordings, musical concerts and the like. The increased accessibility of music in digital formats has led to the development of computer software to interpret digitally formatted music. Electronic instruments and synthesizers have taken a variety of forms and their evolution has shaped music, recording and live performance. These forms include traditional keyboard synthesizers, guitar synthesizers, modular synthesizers, electronic wind instruments, drum synthesizers and others. These electronic devices use a variety of human or electronic inputs to generate sounds through analog and digital signal generation and processing. Lately, digital synthesis has moved beyond hardware devices into software and many artists use their computer as the sound engine or synthesizer.

In conventional systems, the motion of a player's hand is used to control sound generation. All manner of instruments has been modified or built with the intention of controlling synthesizers. Control methods today include nearly all instruments from traditional white and black piano keys to drum pads, to breath-controllers and guitar pickups to digital signals directly from a computer or micro-controller. The development of MIDI (Musical Instrument Digital Interface) protocol provided a standard communication method to enable digital control of musical instruments, upon which synthesizers have leveraged heavily. Sound generation too has taken many forms, additive synthesis, subtractive synthesis, FM synthesis, sample-based synthesis and others. Evidently, synthesizer development has hitherto mostly focused on control and sound generation only.

Furthermore, lighting systems brought about a revolution in stage lighting including digital control of lighting fixtures, colors and temperatures, and movement of light patterns. Where stage lights were previously large, manually controlled, expensive and hot, newer LED based lights are cooler, cheaper and can be digitally controlled. Conventionally, for some performers, the lighting and visual effects are carefully designed around the musical performances. Typically, however, these light shows are designed in advance, and controlled by a dedicated engineer with years of training. Creating coordinated lighting effects is desired but presents many challenges, particularly for cases which involve multiple lighting units in unusual geometries, and those where a performer without lighting training wishes to add a visual element to their performance.

Therefore, a need exists for improved systems for creating and deploying audio synchronized light shows and visual effects, and a need also exists for improved systems for allowing users to create and modify lighting effects in real-time, such as during audio/visual performances.

SUMMARY OF THE INVENTION

In an aspect, an apparatus for generating audio synchronized optical output is provided. The apparatus comprises of an input channel to receive an input signal from an audio source and a controller. The controller is configured to receive input signal from the input channel, analyze the input signal to determine one or more characteristics of the input signal, associate the determined one or more characteristics of the input signal to one or more parameters of an optical output from an optical source, and modulate the one or more parameters of the optical output in accordance with the one or more characteristics of the input signal.

In one or more embodiments, the audio source to the apparatus is a musical instrument.

In one or more embodiments, one or more characteristics of the input signal from the musical instrument to the apparatus comprises one or more of: magnitude, phase, frequency, average intensity, a channel of the input signal, a playing speed of associated musical instrument, and a tempo of associated musical instrument.

In one or more embodiments, the optical source to the apparatus comprises one or more of: light emitting diodes, LASERs, light guides, and optical fibers.

In one or more embodiments, one or more parameters of the optical source to the apparatus comprises at least one of: color, brightness, hue, type of lighting pattern, speed of lighting pattern, type of wave generated, position of optical sources fixtures, fixture pan, and fixture tilt.

In one or more embodiments, the apparatus further comprises a user interface configured to receive an input form a user to manually associate the one or more characteristics of the audio source to the one or more parameters of the optical source.

In one or more embodiments, the user interface is further configured to receive one or more of messages and relevant commands from the user, and wherein the controller is further configured to modulate the one or more parameters of the optical source based on the one or more of messages and relevant keywords received.

In one or more embodiments, the apparatus further comprises external visual elements, and wherein the controller is further configured to control an operation of the external visual elements based on the changing characteristics of the input signal.

In one or more embodiments, the external visual elements comprise at least one of: fog machines, haze machines, water sprinklers, bubble machines, pyrotechnics, aroma diffusers, and display units.

In one or more embodiments, the controller of the apparatus is further configured to randomly generate and modulate the one or more parameters of the optical sources.

In another aspect, a musical instrument for generating audio, MIDI and/or performance synchronized optical output is provided. The musical instrument comprises of an optical element integrated in a housing of the musical instrument and an apparatus provided with the housing of the musical instrument. The apparatus comprises of an input channel to receive an input signal from an audio source, and a controller. The controller is configured to receive the input signal from the input channel, analyze the input signal to determine one or more characteristics of the input signal, associate the determined one or more characteristics of the input signal to one or more parameters of an optical output from an optical source and modulate the one or more parameters of the optical output in accordance with the one or more characteristics of the input signal.

In yet another aspect, a system generating audio and/or performance synchronized optical output is provided. Herein, the system comprises of an audio source, one or more optical sources, and an apparatus communicatively coupled to the audio or MIDI source and the one or more optical elements. The apparatus comprises an input channel to receive an input signal from audio source and a controller which is configured to receive the input signal from the input channel, analyze the input signal to determine one or more characteristics of the input signal, associate the determined one or more characteristics of the input signal to one or more parameters of an optical output from the one or more optical sources, and modulate the one or more parameters of the optical output in accordance with the one or more characteristics of the input signal.

In another aspect, a musical instrument for generating audio and/or performance synchronized optical output is provided. The musical instrument comprises of a lighting controller and a network host provided with the housing of the musical instrument. The apparatus comprises of an input channel to receive an input signal from an audio or MIDI or performance source, a lighting controller, a network host, wired or wireless router and a means for transmitting lighting control data to external lights and other devices. The controller is configured to receive the input signal from the input channel, analyze the input signal to determine one or more characteristics of the input signal, associate the determined one or more characteristics of the input signal to one or more parameters of an optical output or lighting control data from an optical source and modulate the one or more parameters of the generated lighting control data in accordance with the one or more characteristics of the input signal. The device then transmits the resulting lighting control data out to other devices on the connected network.

In yet another aspect, a system of networked musical instruments and stage implements with built in visual effects and/or lights is provided. Herein the system of networked visual effects and lights are controlled in real-time by a musical instrument, stage implement or other human interface device or sensor with an integrated network host and lighting controller. The apparatus comprises an input channel to receive an input signal from audio source and a controller which is configured to receive the input signal from the input channel, analyze the input signal to determine one or more characteristics of the input signal, associate the determined one or more characteristics of the input signal to one or more parameters of an optical output or lighting control data from the one or more optical sources or lighting controllers, and modulate the one or more parameters of the optical output and lighting control data in accordance with the one or more characteristics of the input signal. The resulting lighting control data is then transmitted out to connected lighting and other visual effect devices on the network which receive the lighting control data and generate optical output.

In yet another aspect, a system for communicating lighting control data over a network is provided. Herein, lighting control data is transmitted across a network using UDP packets. The system transmits numbers via UDP packets ranging from 0-255 which correspond to lighting control parameters, and lighting fixture data and fixture addresses.

In yet another aspect, a system of sensors, cameras and microcontrollers collect data from a user's performance and generate lighting control data in real-time in response to the input sensor data. This lighting control data is then transmitted to a variety of connected visual effects sources to generate a synchronized performer-controlled light show.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The present subject matter will now be described in detail with reference to the drawings, which are provided as illustrative examples of the subject matter so as to enable those skilled in the art to practice the subject matter. It will be noted that throughout the appended drawings, like features are identified by like reference numerals. Notably, the FIGUREs and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

Figure 1:
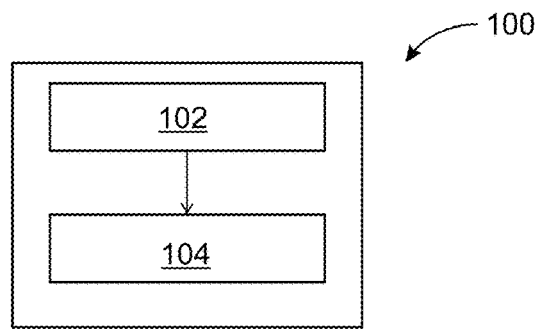
FIG. 1 illustrates a block diagram of an apparatus for generating audio synchronized optical output, in accordance with one or more embodiments of the present disclosure.

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments.

The present invention relates to an apparatus for generating audio and/or MIDI and/or performance synchronized optical output. The present invention aims to provide systems and methods to generate lighting output in response to an audio in an environment, thereby creating a synchronized harmony between one or more optical sources employed in the environment and the audio/performance by mapping one or more properties of the input signal with lighting output parameters. Herein, the apparatus may be employed for generating audio and/or performance synchronized optical output in an entertainment venue. Beneficially, the present invention also aims to provide a user interface to allow a user to efficiently manipulate a relationship between input signals and lighting output. Preferably, the invention relates to associating performance parameters from a MIDI controller to one or more visual output parameters, such as optical output. The MIDI signals are received and processed to control one or more lights, fixtures, patters, fog machines and other displays as discussed later in detail. The combination of these elements into a single apparatus aims to add a new layer of expression and control to musical performance and open up a new type of audio-visual performance.

As discussed, such a system may be employed in an environment. The environment may include at least one of a stadium, an arena, a concert hall, an auditorium, a convention center, a display hall, a nightclub, a discotheque, a live-performance theater, a movie theater, an outdoor theater, a band shell, a recording studio, a film studio, a video studio, a home, a home theater center, a home audio/visual center, a vehicle, an article of clothing, an interior wall, an exterior wall, a sign, a billboard, a tent, and a racetrack. Furthermore, an entertainment event may include one or more of a concert, a play, a movie, a musical, a sporting event, a speech, a rally, and a convention.

Referring to FIG. 1, illustrated is a block diagram of apparatus 100 for generating audio synchronized optical output, in accordance with one or more embodiments of the present disclosure. Apparatus 100 comprises input channel 102 to receive an input signal from an audio source. Herein the term "audio source" refers to a source of input signal that is provided for controlling one or more optical sources arranged in the environment or integrated in a musical instrument. Optionally, the audio sources may include one or more of a musical instrument, a microphone, a speaker, or any other digital or acoustic device used for producing sound and/or other signals that control an operation of audio sources such as musical instruments. Optionally, the audio sources may include one or more mobile media devices. Examples of the mobile media device include, but are not limited to, cellular phones, personal digital assistants (PDAs), handheld devices, tablet computers, media player, etc. The input data may include input signal associated with an audio source, such as a musical instrument, a key or button pressed on an audio source, such as a musical instrument or key or button pressed on an associated device such as an audio mixer or an audio synthesizer, input data from elements such as potentiometers associated with an audio source, sensor data and so forth. Further, the input data is obtained from thermistors, clocks, keyboards, numeric keypads, Musical Instrument Digital Interface ("MIDI") inputs, sensors, DMX control signals, TTL or CMOS logical signals, signals from music players, such as the iPod® from Apple Computer or MP3 players, other visual or audio signals, or any other protocol, cameras, 3D sensors, LIDAR, standard, or other signaling or control technique, whether analog, digital, manual, or any other form. Notably, the input data may be form one of a live event and a prerecorded media. The live event may include a music concert or a recital, dramatic performance, sporting event, an ambient sound, or natural occurrence such as audio from changes in weather, a natural phenomenon, an erupting volcano, storm, or a celestial event.

Notably, the input signal may further include one or more of aural data, visual data, peripheral data, sensor data, or simulated input data. The aural data may include at least one of duration, periodicity, meter, beat, pitch, amplitude, timbre, harmonic profile, rhyme, spectral profile, mixing data, FFT data sequencing data, digital filter coefficients, and transformation data. The visual data may include at least one of color, tone, saturation, depth of field, focus, light, movement, hue, intensity, chromaticity, luminosity, color decomposition, pixel data, visual filter data, visual effect data, and transformation data. The peripheral data may include at least one of genre, popularity, source of origin, creation date, release date, author, and ownership. Such data in a combined form can be received from a number of sources arranged in the environment and processed accordingly to control a visual output.

As aforementioned, the input signal is received through input channel 102. In an example, the input signal may be received through a wired cable. In another example, the input signal may be received wirelessly over a communication network. It will be appreciated that the apparatus is not limited to only receiving input signals, the apparatus may be configured to receive and subsequently process other forms of data also, visual data, peripheral data, sensor data, or simulated input data. As an example, the audio source may further include one or more of a television program, a radio program, a motion picture, a sound recording, a video recording, an image, a video game, a text display, a visual source, a mixed audio-visual source, an algorithm input data and so forth. In a preferred embodiment, the audio source is a musical instrument, and the input signal from the musical instrument is received through the input channel.

Apparatus 100 further comprises controller 104 communicatively coupled to input channel 102. Controller 104 is configured to receive the input signal from the input channel. Further, controller 104 is configured to process the input signal received from one or more audio sources. Throughout the present disclosure, the term "controller" as used herein refers to an arrangement of one or more electronic elements that can be implemented in numerous ways, such as with dedicated hardware, using one or more microprocessors, microcontrollers, programmable digital signal processors, programmable gate arrays, programmable logic devices or other devices that can be programmed to perform the various functions discussed herein, or as a combination of dedicated hardware to perform some functions and programmed microprocessors and associated circuitry to perform other functions. In an example, controller 104 is a dedicated hardware to perform the functions discussed herein. In another example, controller 104 can be one or more microprocessors that may be programmed using software (e.g., microcode) to perform various functions discussed herein. In another example, controller 104 may be a pulse width modulator, pulse amplitude modulator, pulse displacement modulator, resistor ladder, current source, voltage source, voltage ladder, switch, transistor, voltage controller, or other controller. Herein, controller 104 is employed to process the signals form a plurality of audio sources or MIDI sources and regulate an operation of one or more associated optical/visual effects sources. In an example, several optical sources may be driven through separate controllers 104. Furthermore, controller 104 may be implemented with or without employing a processor, and also may be implemented as a combination of dedicated hardware to perform some functions and one or more programmed microprocessors along with an associated circuitry to perform other functions. Examples of controller 104 that may be employed in various embodiments of the present disclosure include, but are not limited to, conventional microprocessors, application specific integrated circuits (ASICs), and field-programmable gate arrays (FPGAs). Examples of such controller 104 as employed in the apparatus are explained in conjunction with FIGS. 9A-9E.

In a preferred embodiment, the apparatus further comprises some external interface media to exchange signals and messages between audio sources, optical sources and controller 104. Such external interface media is employed to create a bridge between audio sources and the apparatus. As an example, external interface media may include Musical Instrument Digital Interface ("MIDI"). As aforementioned, the input signal is a MIDI signal and is directly received by the controller to perform one or more functionality described herein. It is to be understood that MIDI is known in the art, and thus has not been described herein for the brevity of the present disclosure.

Controller 104 is configured to analyze the input signal to determine one or more characteristics of the input signal. Optionally, controller 104 is configured to perform one or more signal processing operations on the input signal to determine one or more characteristics of the input signal. It will be appreciated that several acoustic signal processing and digital signal processing techniques for signal processing are known in the art. Examples of such signal processing techniques include storage, data compression, music information retrieval, speech processing, localization, acoustic detection, transmission, noise cancellation, acoustic fingerprinting, sound recognition, synthesis, and enhancement (e.g. equalization, filtering, level compression, echo and reverb removal or addition, etc.), and other signal processing techniques employed in MIDI signal techniques in one or more examples. Optionally, the one or more characteristics of the input signal comprises one or more of: magnitude, phase, frequency, average intensity, a channel of the input signal, a playing speed of associated musical instrument, and a tempo of associated musical instrument.

Controller 104 is further configured to associate the determined one or more characteristics of the input signal to one or more parameters of an optical output from an optical source. Optionally, the one or more parameters of the optical source comprises at least one of: color, hue, type of lighting pattern, speed of lighting pattern, type of wave generated, position of optical sources fixtures, light pattern pan, and light pattern tilt. Throughout the present disclosure, the term "optical sources" (sometimes referred to as "light sources" or simply "light") as used herein refers to any electrical device capable of receiving an electrical signal and producing electromagnetic radiation or light in response to the signal. The optical sources may be configured to generate electromagnetic radiation within the visible spectrum, outside the visible spectrum, or a combination of both. The term "light" is used when the electromagnetic radiation is within the visible ranges of frequency and the term "radiation" is used when the electromagnetic radiation is outside the visible ranges of frequency. Notably, the optical sources may be configured for a variety of applications, including, but not limited to, indication, display, and/or illumination. The optical sources may use lights of any one or more of a variety of radiating sources, including, but not limited to, Light Emitting Diode (LED) and LED-based sources (including one or more LEDs), electroluminescent strips, incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources such as, photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radio luminescent sources, and luminescent polymers. Optionally, the optical sources comprise one or more of: light emitting diodes, LASERs, light guides, and optical fibers. Notably, the optical sources may be integrated within a system comprising apparatus 100, or the optical sources may be external to apparatus 100 and remotely controlled via apparatus 100.

Throughout the present disclosure, the term "light emitting diodes" or LEDs as used herein refers to LED (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured to generate radiation having various bandwidths for a given spectrum (e.g., narrow bandwidth, broad bandwidth).

Notably, controller 104 is configured to map one or more characteristics of the input signal to the one or more parameters of the optical sources. Notably, the association of one or more characteristics of the input signal to the one or more parameters is a one on one mapping. Additionally, in some examples, each characteristic of the input signal may be associated with more than one parameter of the optical source. Several algorithms may be employed to associate one or more characteristics of the audio sources or MIDI sources to the one or more parameters of the optical sources, as explained later in the description.

According to an embodiment, apparatus 100 further comprises a user interface (not shown) configured to receive an input form a user to manually associate the one or more characteristics of the audio source to the one or more parameters of the optical source. Throughout the present disclosure, the term "user interface" as used herein refers to an interface between a human user or operator and one or more devices that enables communication between the user and the device(s). Examples of user interfaces that may be employed in various implementations of the present invention include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones, cameras, 3D sensors and other types of sensors that may receive some form of human-generated stimulus and generate a signal in response thereto. Optionally, several parameters associated with optical sources, such as position of LEDs, color of LEDs, color temperature of LEDs, brightness of LEDs, group of lighting fixtures, different lighting patterns, different speeds of generation of lighting patterns are presented on the user interface. Further, several characteristics of the audio sources such as volume or velocity of input signal, playing speed of a particular musical instrument, note number, scale of the input signal, average intensity of input signal and so forth are presented on the user interface. The user is further prompted to associate the display characteristics to corresponding parameters as one desire according to a type of performance. Optionally, the apparatus 100 further comprises other interactive user interface such as a knob, a dial, a button, a touch screen, a serial keypad, a slide mechanism, a switch, a sliding switch, a switch/slide combination, capacitor-input touch sensor, a sensor, a decibel meter, an inclinometer, a thermometer, an anemometer, a barometer, or any other input capable of providing a signal to controller 104 that can be integrated with the musical instrument, or any other element used during performance such as microphone stands or platforms or other stage implements. Such interactive user interface allow user to modulate one or more parameters during a live performance. For example, a performer in a music concert is provided with a slider for increasing or decreasing brightness of LEDs in the arranged in the environment during a live performance.

According to an embodiment, the user interface is further configured to receive one or more of messages and relevant commands from the user. As an example, the user can provide messages such as "high", "low", "up", "down" via the user interface. Further, user may also provide voice input indicating a change in parameters of the optical sources. Further, controller 104 is configured to modulate the one or more parameters of the optical source based on the one or more of messages and relevant keywords received. As an example, during a singing performance, certain words such as chorus of the song can be set as relevant keywords, and each time chorus is sung the performer, one or more parameters of the optical source are changed accordingly, say an increase in number of LEDs in an ON state, or an increase in speed of the lighting pattern etc.

Optionally, controller 104 is further configured to randomly generate and modulate the one or more parameters of the optical sources. Controller 104 is further configured to modulate the one or more parameters of the optical output in accordance with the one or more characteristics of the input signal. The one or more parameters of the optical sources can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.).

As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect i.e. a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices.

As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Optionally, controller 104 may employ sound reactive lighting example algorithms. In an example, the algorithm may configure controller 104 to light a number of LEDs based on the volume of the sound, at a color corresponding to the frequency of the sound. The parameter number of LEDs in ON state is associated with an audio volume, and LED color is associated with sound frequency. In another example, the algorithm may configure controller 104 to generate a pulse when a sound is played using a sine wave generator. The parameter pulse width is associated with sound volume, pulse starting color is associated with sound frequency, and pulse spread speed is associated with running average sound volume. Further, for every loop iteration, starting color is enhanced or changed to next by one unit, pulse position is increased by one unit, and pulse brightness is decreased by one unit. In another example, the algorithm may configure controller 104 to generate a scrolling rainbow and advance the rainbow for each sound played. The parameter LED hue is associated with LED position, and LED position is increased by one unit for each sound over base threshold.

It will be appreciated that the above-mentioned algorithm are examples of mapping audio performance characteristics to LED color, brightness, and positions. Generally, by using software, any discernible performance characteristic can be mapped to any lighting parameter, or any function generator controlling any lighting parameter. For example, volume could be an input to a sign wave generator which would generate color sine waves going through fixtures at a speed based on average note velocity. Average volume over time could control a color palette through which the wave generator rotates. More complex patterns are created by creating an array of lights or LEDs and their current hue or brightness values. By iterating through this array and using performance or MIDI characteristics to change array values, a near infinite variety of shapes and pulses, rainbows, and other patterns can be created which are reactive to the player's performance. The resulting array of lights, colors and brightness can subsequently be broadcasted out to other external lights using Artnet DMX/DMX/SPI/MIDI or other wired or wireless protocols or a proprietary UDP based protocol to create complex light shows generated entirely by the player's live performance. Sound control algorithms can also use combinations of DSP effects to modify the incoming signal and resulting lighting patterns. For example, the lighting controller could add delay to the sound to have it pulse and fade in regular intervals, or add compression to smooth peaks and valleys in the performance. Reverb could be included to translate into a slower fade of the LEDs from lit to unlit. Equalizers and filters can be employed to look only at certain frequency spectrums of the performance, for example, filtering out muddy bass sounds, or focusing only on high pitched melodic sounds. Not all lighting parameters will be controlled by performance characteristics. Many patterns rely heavily on randomness to create interesting and non-repetitive effects, for example, using a random number to determine the starting position of a wave or pattern, or using random colors or brightness to vary effects. Random numbers are also combined with actual performance characteristics as well. For example, brightness of an LED could be determined by a random number and the actual volume of a played sound to make a pattern that is both reactive and also varied and non-repetitive.

Optionally, the apparatus further comprises external visual elements. The external visual elements comprise at least one of: fog machines, haze machines, light fixtures, moving heads, light fixtures, panels, bubble machines, pyrotechnics, LASERS, gas cannons, water sprinklers, aroma diffusers, and other display or visual effects units. Further, the controller is further configured to control an operation of the external visual elements based on the changing characteristics of the input signal. Optionally, the operating parameters of such external visual elements can also be associated with characteristics of input signal is a similar fashion as discussed above, and further control the operation thereof. In an example, the external visual element is a display unit configured to display video content in harmony with an audio performance in the environment.

Figure 2:
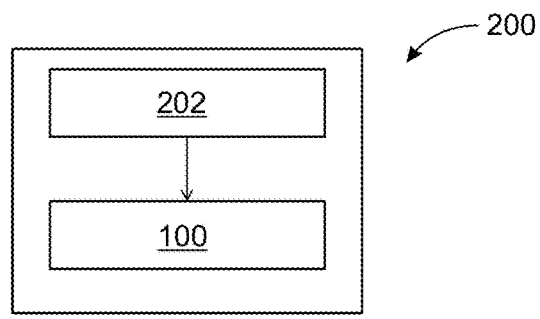
FIG. 2 illustrates a block diagram of a musical instrument for generating audio synchronized optical output, in accordance with one or more embodiments of the present disclosure.

Referring to FIG. 2, illustrated is a block diagram of musical instrument 200 for generating audio synchronized optical output, in accordance with one or more embodiments of the present disclosure. As shown, musical instrument 200 comprises optical element 202 integrated in a housing (i.e., body) of the musical instrument 200. Further, musical instrument 200 comprises apparatus 100 (as explained in detail in conjunction with FIG. 1) provided with (or integrated in) the housing of musical instrument 200. Throughout the present disclosure, the term "musical instrument" as used herein refers to is a device that is able to generate musical vibrations and launch them into the air or transmit the signals via an amplifier or sound module. Each instrument sound is characteristically different according to its tone color or timbre; that is, a combination of a fundamental vibrational mode and a number of harmonics, or overtones, of varying amplitudes which uniquely distinguish its sound from the sounds of other instruments. Instrument sounds are also characterized by pitch (determined by the rate of vibration); the duration of the vibration, and the dynamic range of the instrument as determined by the force of the vibration. Examples of musical instruments include, but are not limited to, stringed instruments such as acoustic guitar, acoustoelectric guitar, aeolian harp, autoharp, biwa, banjo, bass, cello, cimbalom, cittern, double bass, dulcimer, electric bass, electric guitar (solid body), fiddle, gittern, hackbrett, harp, hurdy gurdy, kamanga, koto, lute, lyre, mandolin, psaltry, rabab, saranga, sarinda, steel guitar, theorbo, tromba marina, ukulele, viol, viola, violin, zither; percussion instruments such as bass drum, bongo drum, cabaca, castanets, celesta, chimes, claves, cymbals, finger cymbals, glockenspiel, gong, guiro, kakko, kettledrum, maracas, marimba, naker, shoko, sistrum, snare drum, spoons, tabor, taiko, tambourine, tenor drum, triangle, tuba phone, vibraphone, wood block, xylophone; woodwind instruments such as aulo, baryton, bass clarinet, bassoon, clarinet, contra-bassoon, crumhorn, English horn, flageolet, flute, gourd flute, harmonica heckelphone, hirchiriki, kaval, launedoa, oboe, ocarina, oteki, panpipe, piccolo, rackett, recorder, sarrusophone, saxaphone, shawm, sho, swanee whistle, tarogato; brass instruments such as alpenhorn, bass trumpet, bugle, coronet, double horn, euphonium, flugelhorn, French horn, ophicleide, posthorn, trombone, trumpet, tuba, and keyboard instruments such as accordion, bagpipe, harpsichord, organ, piano, pianoforte, sansa. Throughout the present disclosure, the term "optical elements" as used herein refers to illumination sources integrated with an instrument or any other object in the environment, such as apparels, table tops, microphone stands, walls, pools or any other surface or area in the environment that is used for enhancing audio visual performance. It will be appreciated that such musical instruments 200 may be independently capable of producing audio synchronized visual outputs, or the musical instruments may be communicatively coupled to the apparatus 100 to be controlled remotely.

Figure 3:
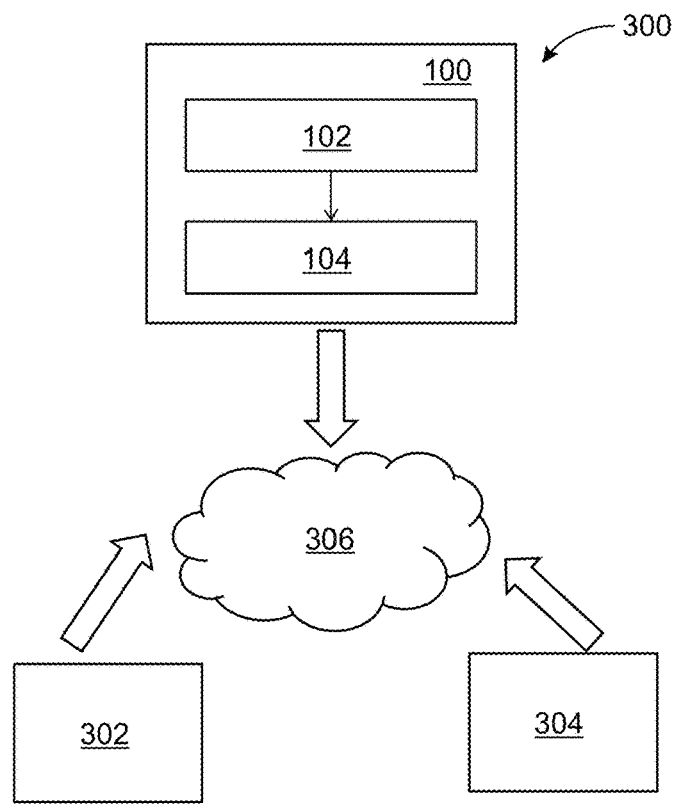
FIG. 3 illustrates a block diagram of a system for generating audio synchronized optical output, in accordance with one or more embodiments of the present disclosure.

Referring to FIG. 3, illustrated is a block diagram of system 300 for generating audio synchronized optical output, in accordance with one or more embodiments of the present disclosure. As shown, system 300 comprises audio source 302, one or more optical sources 304 and apparatus 100 communicatively coupled to audio source 302 and one or more optical sources 304. Herein, apparatus 100 is coupled to audio source 302 and one or more optical sources 304 via communication network 306. Herein, the term "communication network" refers to any interconnection of two or more devices (including controllers) that facilitates the transport of information (e.g. for device control, data storage, data exchange, diagnostics, etc.) between any two or more devices and/or among multiple devices coupled to the network The communication network may be wired, wireless, or a combination thereof. Examples of the communication network include, but are not limited to, Local Area Networks (LANs), Wide Area Networks (WANs), Metropolitan Area Networks (MANs), Wireless LANs (WLANs), Wireless WANs (WWANs), Wireless MANs (WMANs), Bluetooth networks the Internet, radio networks, telecommunication networks, and Worldwide Interoperability for Microwave Access (WiMAX) networks. Generally, the term "Internet" relates to any collection of networks using standard protocols. For example, the term includes a collection of interconnected (public and/or private) networks that are linked together by a set of standard protocols (such as TCP/IP, UDP, HTTP, and FTP) to form a global, distributed network.

Herein the term "audio source" refers to a source of input data that is provided for controlling one or more optical sources arranged in the environment or integrated in a musical instrument. Optionally, the audio sources may include one or more of a musical instrument, a microphone, a speaker, or any other digital or acoustic device used for producing sound. Optionally, the audio sources may include one or more mobile media devices. Examples of the mobile media device include, but are not limited to, cellular phones, personal digital assistants (PDAs), handheld devices, tablet computers, media player, etc. The input signal is associated with an audio source, such as a musical instrument, a key or button pressed on an audio source, such as a musical instrument or key or button pressed on an associated device such as an audio mixer or an audio synthesizer, input data from elements such as potentiometers associated with an audio source, sensor data and so forth. Further, the input data is obtained from thermistors, clocks, keyboards, numeric keypads, Musical Instrument Digital Interface ("MIDI") inputs, DMX control signals, TTL or CMOS logical signals, signals from music players, such as the iPod from Apple Computer or MP3 players, other visual or audio signals, or any other protocol, standard, or other signaling or control technique, whether analog, digital, manual, or any other form.

In a preferred embodiment, a musical instrument for generating audio and/or performance synchronized optical output is provided. The musical instrument comprises of an optical element integrated in a housing of the musical instrument and an apparatus provided with the housing of the musical instrument. The apparatus comprises of an input channel to receive a MIDI signal from a MIDI source coupled with the musical instrument, and a MIDI controller. The MIDI controller is configured to receive the MIDI signal from the input channel, analyze the MIDI signal to determine one or more characteristics of the MIDI signal, associate the determined one or more characteristics of the MIDI signal to one or more parameters of an optical output from an optical source and modulate the one or more parameters of the optical output in accordance with the one or more characteristics of the MIDI signal.

Hereinafter, controller 104 employed for controlling output from optical sources is sometimes referred to as lighting controller. The lighting controller's controls and patterns can then be either remotely controlled over WIFI, Bluetooth or other wireless communication, controlled on board the instrument itself using potentiometers, buttons, touchscreen, by a smartphone app, computer, or other controls. In this way the user can control the sensitivity of the controller to the incoming audio or control signals, control the colors, patterns and brightness of the lights and other parameters of the light show and even program their own lighting patterns and programs. The lighting controller could also be configured to accept external control, by way of DMX or MIDI or other protocol to accept external cues from other performers, the lighting engineer, or a performer's other equipment. This could enable the instrument to change its color palette, patterns, intensity or other lighting parameters in sync with the performance around it. For example, when a musician moves from one song to the next, a MIDI messages could be sent to the lighting controller, which could tell it to switch to the next pattern to prepare for the next song. Additionally, MIDI controls like CC messages could be used to cause changes in the lighting in response to expressive playing from the performer. For example, the color palette of the lights could change when the performer bends a note or uses the modulation wheel of a synthesizer. With practice, musicians will be able to use this technology to add unique visual forms of expression to their performance.

In addition to lights, other visual elements may be integrated into such instruments. For example, the lighting controller could also control lasers, LED panels, displays, fog or haze machines or other visual elements either integrated or external. Just as with effect lighting, the control of other visual elements can add additional layers of expressivity to musical performance. Integrating a display or LED panel for example could enable players to control music videos and visualizers with their playing. The instrument itself could be covered in a display panel which could play videos which are controlled by the player's performance. Integrating lasers could also add a dramatic element to such audio-visual instruments. An example could be a guitar with lasers integrated into the neck or body, which shoots dramatically off into the air when the player plays a solo. Similarly, a guitar body or keyboard housing could be built of an LED screen, in which a variety of visuals or visual effects are controlled or triggered by the performer's playing.

One example of this invention is a synthesizer with a semi-transparent enclosure which is filled with LED lights. The synthesizer sends sound, MIDI, or other controls to the integrated lighting controller. The controller in turn reacts to the sound or control signals from the user's performance, lighting the LEDs along with the playing to add a visual element to the performance. The user can control the sensitivity of the controller using a control onboard the synthesizer, and can control patterns and other advanced controls using a Bluetooth® based smartphone app or the like which connects the smartphone to the controller. This synthesizer could be a small MIDI controlled sound synthesizer controlled externally via MIDI, a full size keyboard synthesizer with piano keys, a drum machine synthesizer with buttons or pads for triggering notes, or take any number of other forms like guitars, electronic breath instruments, drums or other musical instruments.

While LEDs are common in electronic musical instruments, they are typically used as either control or status indicators or educational tools. Most common is the use of an LED to indicate whether a control or device is active, and are used to inform the player. LEDs have also become common in recent years as teaching aids to help developing players learn an instrument. These LEDs will typically light up to indicate the next note to be played in order to help players learn songs or scales. In drum machines and various MIDI controllers, LEDs are also used to light up drum pads and indicate when notes are triggered. The primary difference between these indicators or educational tools and the invention described here is that these lights are primarily to inform the user, rather than to be a part of the performance itself. While typically LEDs and lights on instruments are to inform or teach the user, these lights are meant to add a visual aspect for the visual stimulation or enjoyment of the audience and performer.

The lighting controller could also be integrated into a larger lighting rig and used to control external lights as well. This could include traditional stage lighting like moving heads, wash lights, lasers or LED displays, or newer types of lighting such as lighting integrated into a performer's clothing or costume. For example, a performer could wear clothing with integrated LED strips that were also controlled by their instrument's onboard lighting controller, turning their clothing into an extension of their audio-visual performance.

The lighting controller in some iterations may also serve as an Artnet/SACN/E1.31/MQTT WiFi/UDP router/WiFi Router/Ethernet Router or wired DMX host. In this case the integrated lighting controller will use software/hardware to convert the player's performance into DMX/Artnet/SPI/ other lighting control information or UDP packets which can be used to control external/internal lighting. Using WiFi, the controller can also wirelessly send MIDI data to computers, other instruments, other lighting controllers, or to a lighting desk. These wireless protocols will enable players with no or extremely little knowledge of lighting control to control large stage lighting rigs, just by playing their instrument as they normally do.

It will be appreciated that FIG. 3 is merely an example, which should not unduly limit the scope of the present disclosure. It is to be understood that the specific designation for the system 300 is provided as an example and is not to be construed as limiting the system 300 to specific numbers, types, or arrangements of audio sources, one or more optical sources and apparatuses and communication networks. A person skilled in the art will recognize many variations, alternatives, and modifications of embodiments of the present disclosure. Several other embodiments of such system 300 are explained in detail in conjunction with FIGS. 4, 5, 6, 7 and 8.

Figure 4:
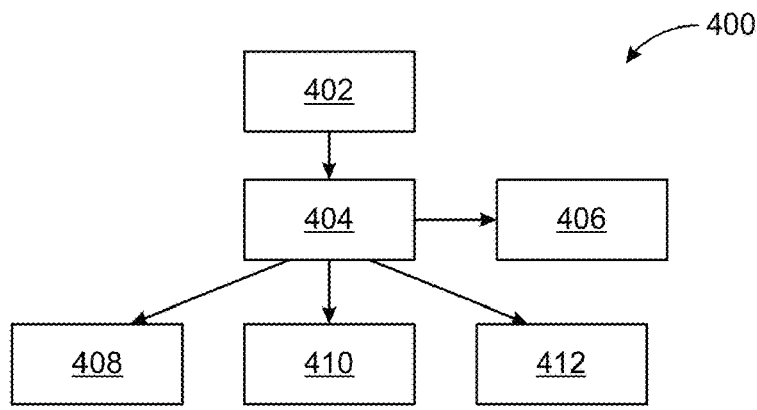
FIGS. 4-8 are illustrations of schematic representations of different arrangements of system of FIG. 3, in accordance with various embodiments of the present disclosure.

Referring to FIG. 4, illustrated is a block diagram of system 400 for generating audio synchronized optical output, in accordance with one or more embodiments of the present disclosure. As shown, system 400 comprises audio source 402, controller 404 (such as controller 104 of FIG. 1), processing unit 406, one or more integrated optical sources 408, audio synthesizer 410, and one or more external visual elements and/or optical sources 412. The one or more integrated optical sources 408, audio synthesizer 410, and one or more external visual elements and/or optical sources 412 are coupled with controller 404 and is controlled based on inputs from audio source 402. Further, herein, controller 404 is coupled with processing unit 406 to receive input data from audio source 402. In an example, the input data is MIDI data input, buttons/keys pressed, sensor data, potentiometers, audio signals and other analog or digital signals. In an example, audio source 402 is a musical instrument or any other acoustic device that produces vibrations that are processed by the processing unit 406. The MIDI data input is received from the musical instrument and processed by processing unit 406. The processed input data from the musical instrument is fed to controller 404 is further configured to modulate the one or more parameters of the optical output from optical sources 412 in accordance with the one or more characteristics of the input signal from the musical instrument. The one or more parameters of optical sources 412 are modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures). The audio synthesizer 410 sends sound, MIDI, or other controls to the controller 404. The controller 404 in turn reacts to the sound or control signals from the user's performance, lighting the LEDs along with the playing to add a visual element to the performance.

Figure 5:
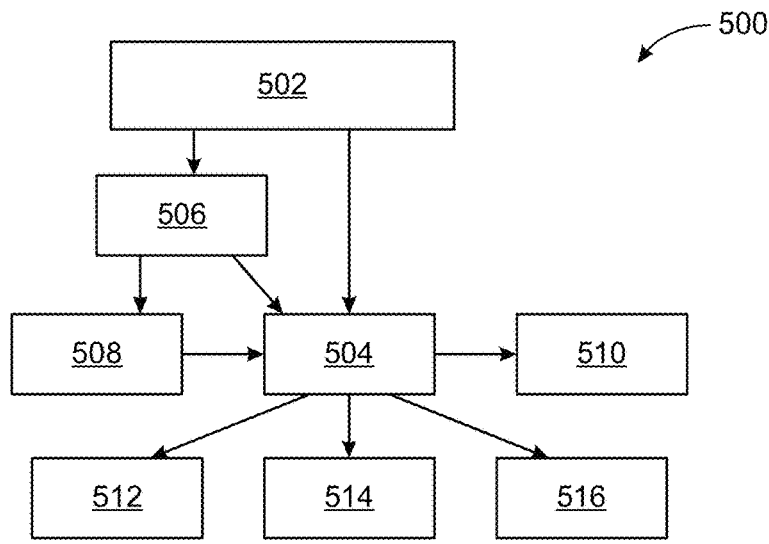

Referring to FIG. 5, illustrated is a block diagram of system 500 for generating audio synchronized optical output, in accordance with one or more embodiments of the present disclosure. As shown, system 500 comprises audio source 502, controller 504, instrument microcontroller 506, synthesizer or voice chip instrument 508, processing unit 510, one or more integrated optical sources 512, external lighting controller 514, and one or more external visual elements and/or optical sources 516. Controller 504 is coupled to one or more integrated optical sources 512, external lighting controller 514, and one or more external visual elements and/or optical sources 516 via a communication network. Herein, controller 504 is configured to receive input data from audio source 502 via the instrument microcontroller 506 and synthesizer or voice chip instrument 508. In an example, audio source 502 is a musical instrument or any other acoustic device that produces vibrations that are processed by the processing unit 510. The MIDI data input is received from the musical instrument and processed by processing unit 510. The processed input data from the musical instrument is fed to controller 504 is further configured to modulate the one or more parameters of the optical output from optical sources 512 or external optical sources 516 in accordance with the one or more characteristics of the input signal from the musical instrument. The one or more parameters of optical sources 512 or external optical sources 516 are modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures). The audio synthesizer 508 sends sound, MIDI, or other controls to t controller 504. Controller 504 in turn reacts to the sound or control signals from the user's performance, lighting the LEDs along with the playing to add a visual element to the performance.

Figure 6:
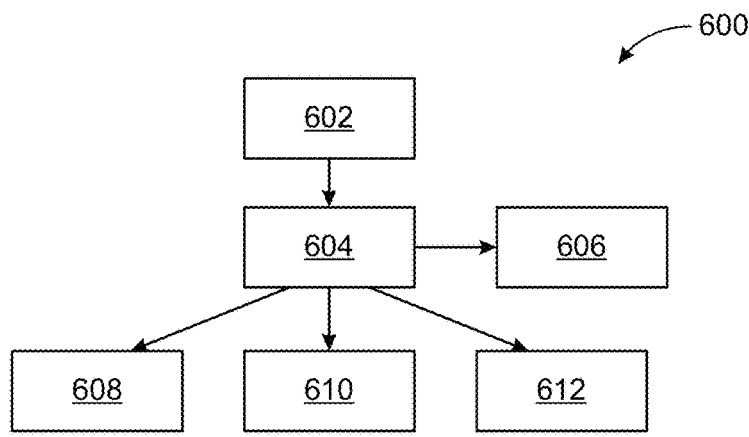

Referring to FIG. 6, illustrated is block diagram 600 for generating audio synchronized optical output, in accordance with one or more embodiments of the present disclosure. As shown, system 600 comprises audio source 602, integrated controller 604, processing unit 606, integrated lights 608, external lighting controller 610, and one or more external optical sources 612. Integrated lights 608, external lighting controller 610, and one or more external optical sources 612 are coupled to integrated controller 604. Herein, integrated controller 604 is configured to receive input data from audio source 602, and further process the signals via processing unit 606 to associate one or more characteristics of the input data to parameters of optical elements 608. In an example, audio source 602 is a musical instrument or any other acoustic device that produces vibrations that are processed by processing unit 606. The MIDI data input is received from the musical instrument and processed by processing unit 606. The processed input data from the musical instrument is fed to external lighting controller 610 is further configured to modulate the one or more parameters of the optical output from the optical sources 612 and integrated lights 608 in accordance with the one or more characteristics of the input signal from the musical instrument. The one or more parameters of optical sources 612 and integrated lights 608 are modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures). The audio synthesizer 410 sends sound, MIDI, or other controls to controller 404. Controller 404 in turn reacts to the sound or control signals from the user's performance, lighting the LEDs along with the playing to add a visual element to the performance.

Figure 7:
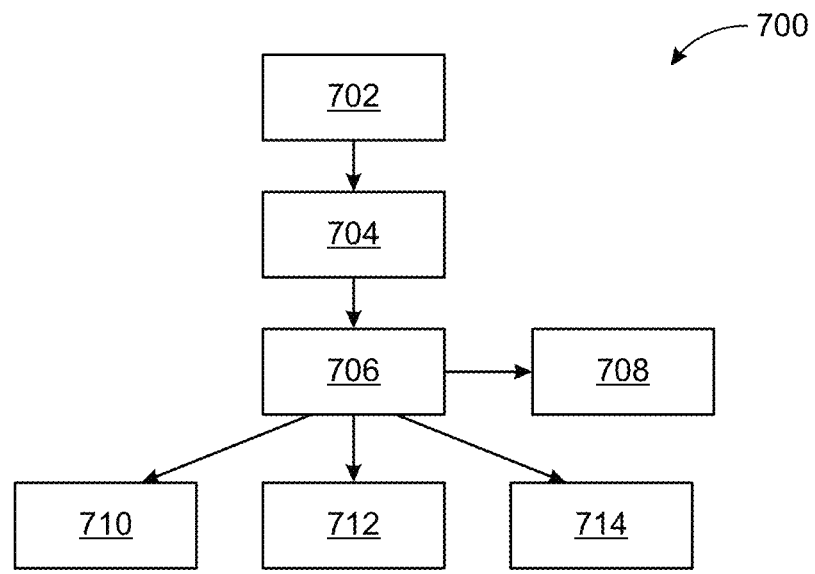

Referring to FIG. 7, illustrated is block diagram 700 for generating audio synchronized optical output, in accordance with one or more embodiments of the present disclosure. As shown, system 100 comprises audio source 702, signal attenuator 704, integrated controller 706, processing unit 708, integrated lights 710, external lighting controller 712 and external optical sources 714. Herein, signal attenuator 704 is configured to receive raw input signals from audio source 702. Further, processed signals are received by integrated controller 706 and are further processed by processing unit 708 to determine characteristics of the input signal received. Further, the characteristics are mapped with one or more parameters of optical sources 712 and 714. Optical sources 712 and 714 are coupled with integrated controller 706 and are controlled accordingly. In an example, audio source 702 is a musical instrument or any other acoustic device that produces vibrations that are processed by processing unit 708. Signal attenuator 704 dampens the noise signal in the received input signal and increases the signal to noise ratio. The MIDI data input is received from the musical instrument and processed by processing unit 708. The processed input data from the musical instrument is fed to integrated controller 706. integrated controller 706 is further configured to modulate the one or more parameters of the optical output from optical sources 712, 714 in accordance with the one or more characteristics of the input signal from the musical instrument. The one or more parameters of optical sources 712, 714 are modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures).

Figure 8:
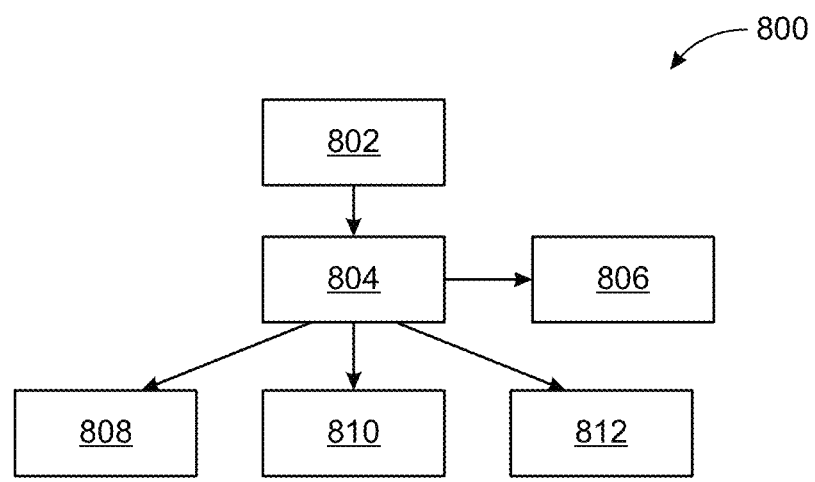

Referring to FIG. 8, illustrated is block diagram 800 for generating audio synchronized optical output, in accordance with one or more embodiments of the present disclosure. As shown, the system comprises MIDI data source 802, integrated controller 804, processing unit 806, integrated optical sources 808, external lighting controller 810 and external optical source 812. Herein, the integrated controller 804 is coupled to MIDI data source 802 and is configured to receive MIDI data therefrom. Further, the integrated controller 804 is configured to process the MIDI data to determine corresponding characteristics and associate the characteristics with one or more parameters of the optical sources 808 and 812. Further, external lighting controller 810 in communication with integrated controller 804 which is configured to control parameters of optical sources 808 and 812. In an example, audio source 802 is a MIDI data source. The MIDI data input is received from the musical instrument and processed by processing unit 406. Integrated controller 804 is further configured to modulate the one or more parameters of the optical output from optical sources 808 and 812 in accordance with the one or more characteristics of the input signal from MIDI data source 802. One or more parameters of optical sources 808 and 812 are modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures).

Figure 9A:
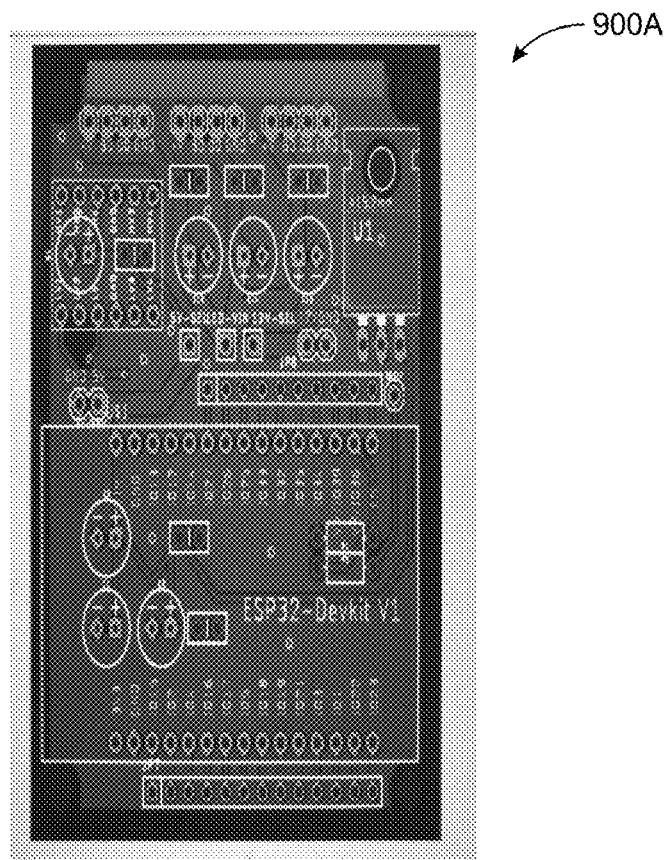
FIGS. 9A-9C are illustrations of different microcontroller chips for use in a controller of FIG. 1, in accordance with one or more embodiment of the present disclosure.

Referring to FIG. 9A, illustrated is microcontroller PCB 900A for use in a controller of FIG. 1, in accordance with an embodiment of the present disclosure. This board can also be used to control an external connected lighting fixture which receives data from a master lighting controller or musical instrument. Herein, microcontroller 900A is an ESP32-DEV kit as known in the art.

Figure 9B:
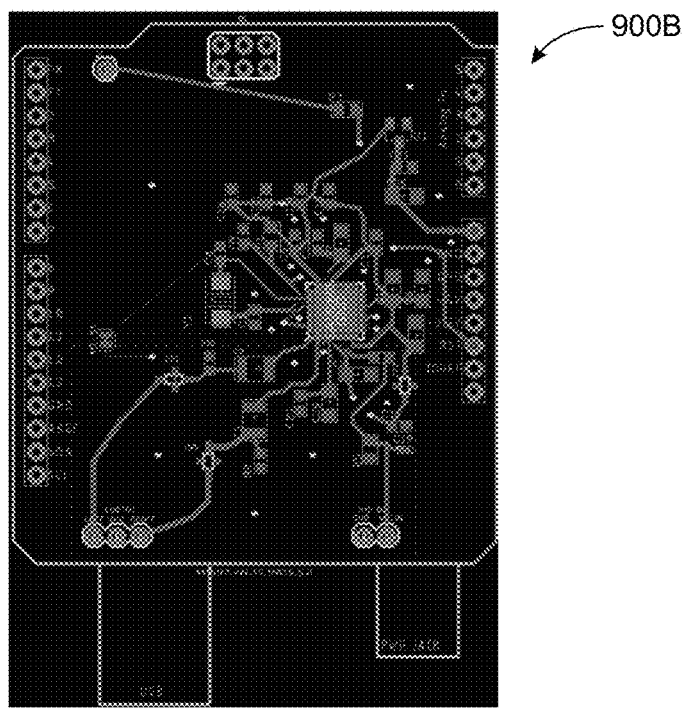

Referring to FIG. 9B, illustrated is microcontroller chip 900B for use in a controller of FIG. 1, in accordance with an embodiment of the present disclosure. As shown, microcontroller chip 900B is an ARDUINO SAM2695 as known in the art.

Figure 9C:
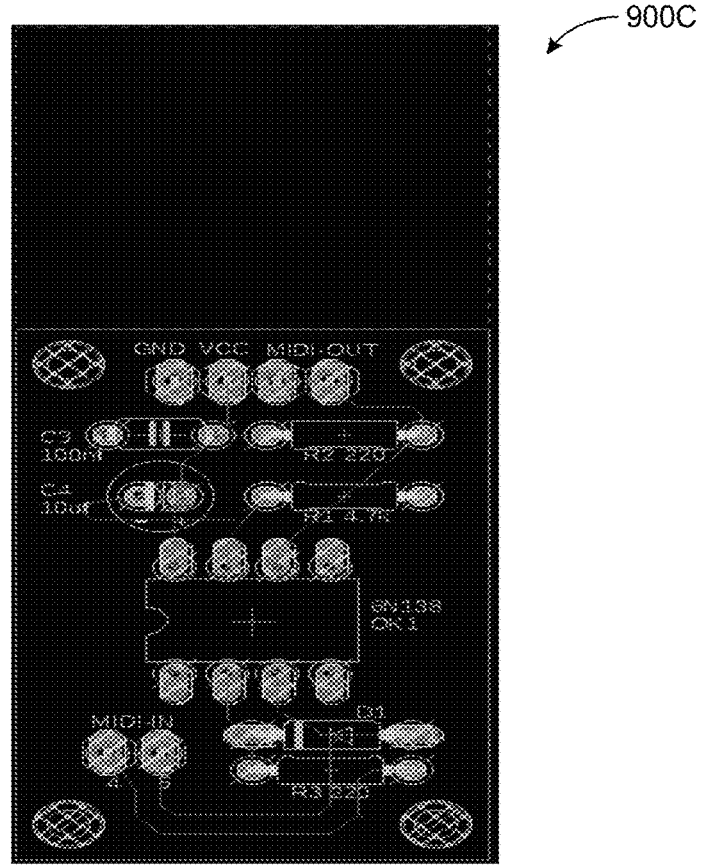

Referring to FIG. 9C, illustrated is microcontroller chip 900C for use in a controller of FIG. 1, in accordance with an embodiment of the present disclosure. As shown, microcontroller 900C is a MIDI controller 6N-138 as known in the art.

Figure 9D:
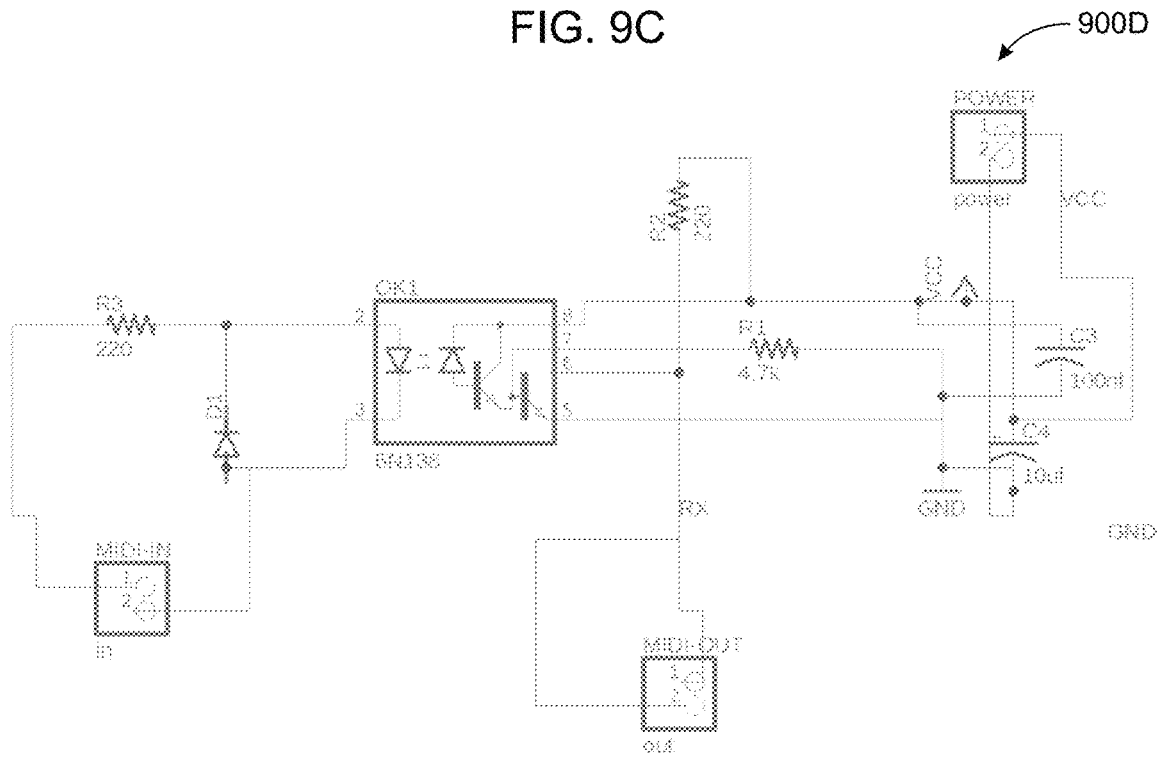
FIG. 9D is an illustration of a circuit diagram of the microcontroller of FIG. 9C, in accordance with an embodiment of the present disclosure.

Referring to FIG. 9D, illustrated is circuit diagram 900D of microcontroller 900C of FIG. 9C, in accordance with an embodiment of the present disclosure. Herein, a control circuitry of the MIDI controller 6N-138, with resistors, diodes, power sources, capacitors and the like are shown.

Figure 9E:
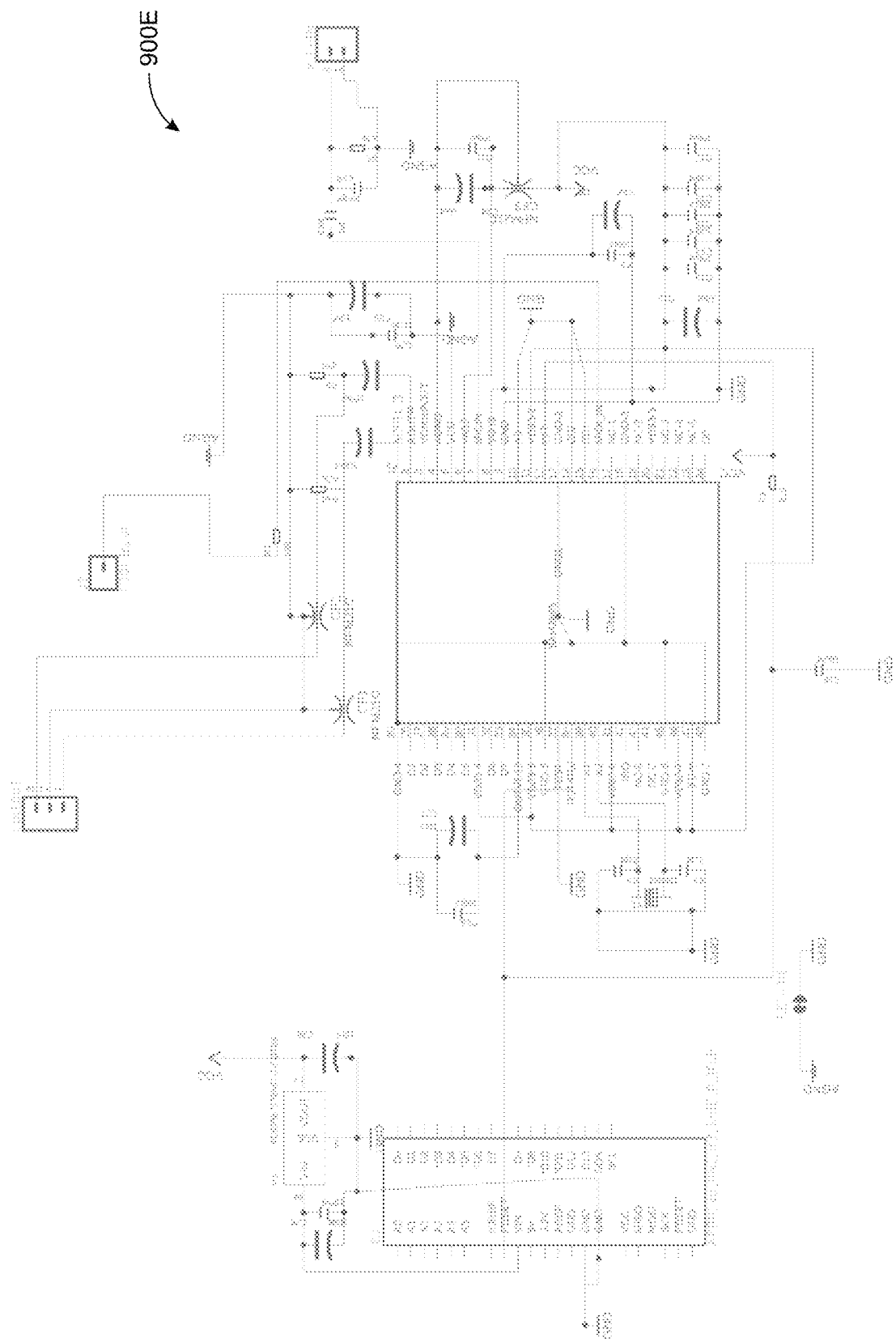
FIG. 9E is an illustration of a circuit diagram of the microcontroller of FIG. 9B, in accordance with an embodiment of the present disclosure.

Referring to FIG. 9E, illustrated is circuit diagram 900E of microcontroller 900B of FIG. 9B, in accordance with an embodiment of the present disclosure. Herein, a control circuitry of ARDUINO SAM2695 comprising resistors, diodes, power sources, capacitors and the like is shown.

Figure 10:
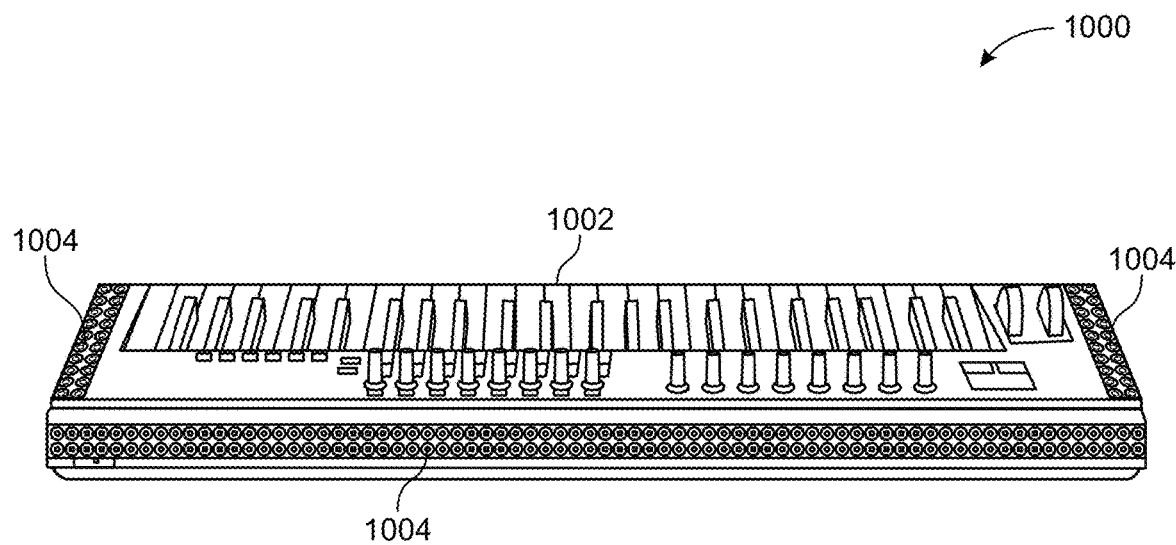
FIGS. 10-17 are illustrations of schematic representations of various musical instruments, in accordance with one or more embodiments of the present disclosure.

Referring to FIG. 10, illustrated is a schematic representation of keyboard 1000 in accordance with one or more embodiments of the present disclosure. As shown, a housing of keyboard 1000 is integrated with LEDs 1004 (like LED strips 1004). When key 1002 is pressed, an audio input signal is sent to an apparatus (such as apparatus 100, not shown herein) provided with the keyboard 1000. Based on one or more of the characteristics of the audio input signal, say the position of key 1002, one or more parameters of the one or more LEDs 1004 change, say the color of the light emitted. When a music piece is played, based on various performance characteristics' mapping to various lighting parameters, LEDs 1004 glow in accordance. Notably, one or more characteristics of the input signal of keyboard 1000 are mapped to the one or more parameters of LED strips 1004. The association of the one or more characteristics of the input signal to the one or more parameters is a one on one mapping. Additionally, in some examples, each characteristic of the input signal of the keyboard 1000 may be associated with more than one parameter of the LED strips 1004. Several algorithms may be employed to associate one or more characteristics of the keyboard 1000 to the one or more parameters of the LED strips 1004. In an example, the controller (such as controller 104 not shown herein) is further configured to modulate the one or more parameters of the optical output in accordance with the one or more characteristics of the input signal of keyboard 1000. One or more parameters of LED strips 1004 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps i.e. movement of light across a space. As another example, one or more parameters are modulated to fill a space linearly, radially, spirals and other geometric shapes such as line movement, polygon movement, 3D shape movement, and so forth.

Figure 11:
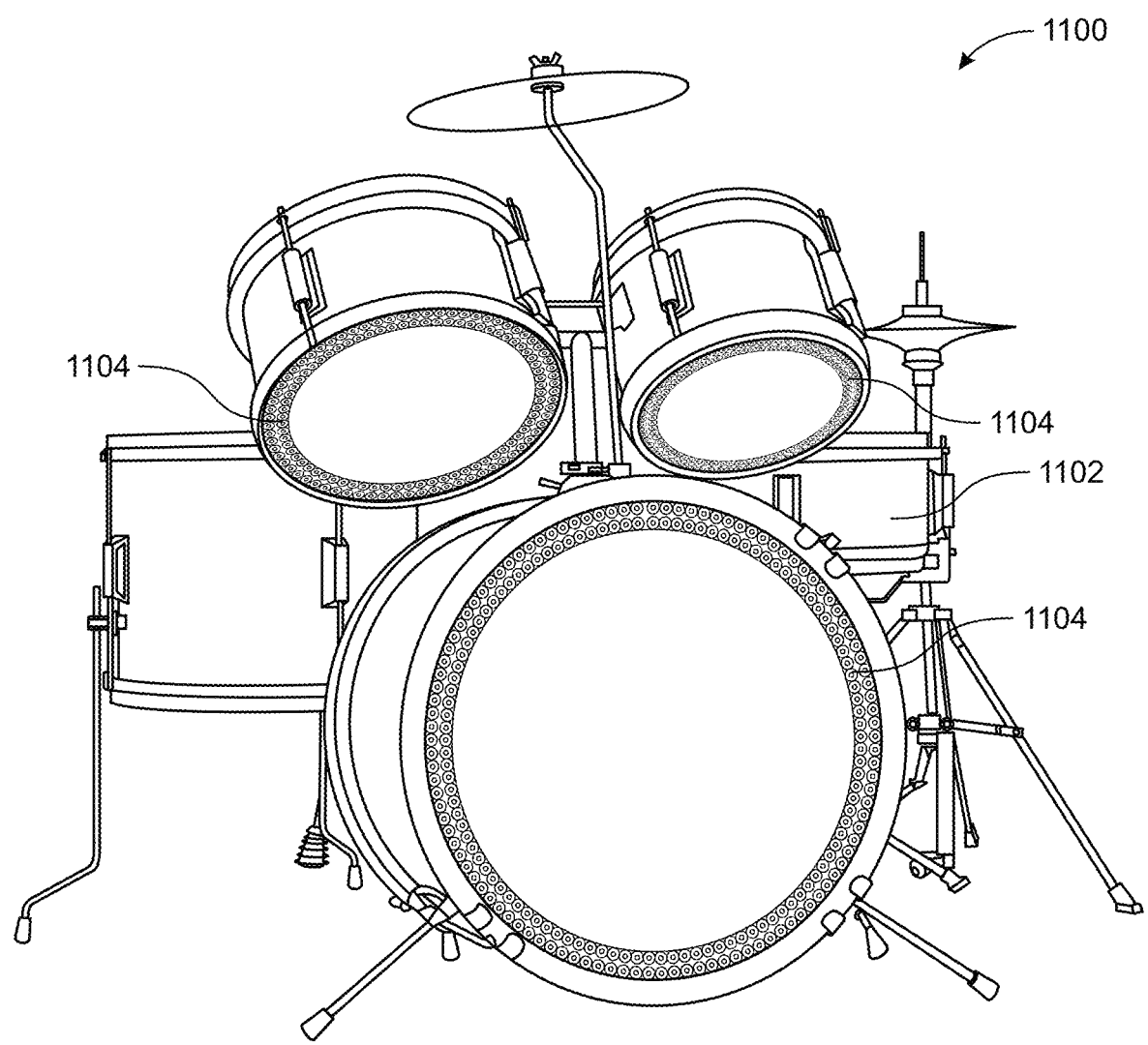

Referring to FIG. 11, illustrated is a schematic representation of drum kit 1100 in accordance with one or more embodiments of the present disclosure. As shown, body 1102 of the drum kit 1100 is integrated with LEDs 1104. When an artist beats drum 1100, an audio input signal is sent to an apparatus (such as apparatus 100, not shown herein) provided with the drum kit 1100. Based on one or more of the characteristics of the audio input signal, say the volume of the sound produced, one or more parameters of one or more LEDs 1104 change, say the brightness of the light emitted. When a music piece is played, based on various performance characteristics' mapping to various lighting parameters, LED 1104 glow in accordance. Notably, one or more characteristics of the input signal of drum kit 1100 are mapped to one or more parameters of LEDs 1104. The association of the one or more characteristics of the input signal to the one or more parameters is a one on one mapping. Additionally, in some examples, each characteristic of the input signal of drum kit 1100 may be associated with more than one parameter of LEDs 1104. Several algorithms may be employed to associate one or more characteristics of drum kit 1100 to the one or more parameters of LEDs 1104. In an example, the controller (such as controller 104 not shown herein) is further configured to modulate the one or more parameters of the optical output in accordance with the one or more characteristics of the input signal of the drum kit 1100. The one or more parameters of LEDs 1104 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Figure 12:
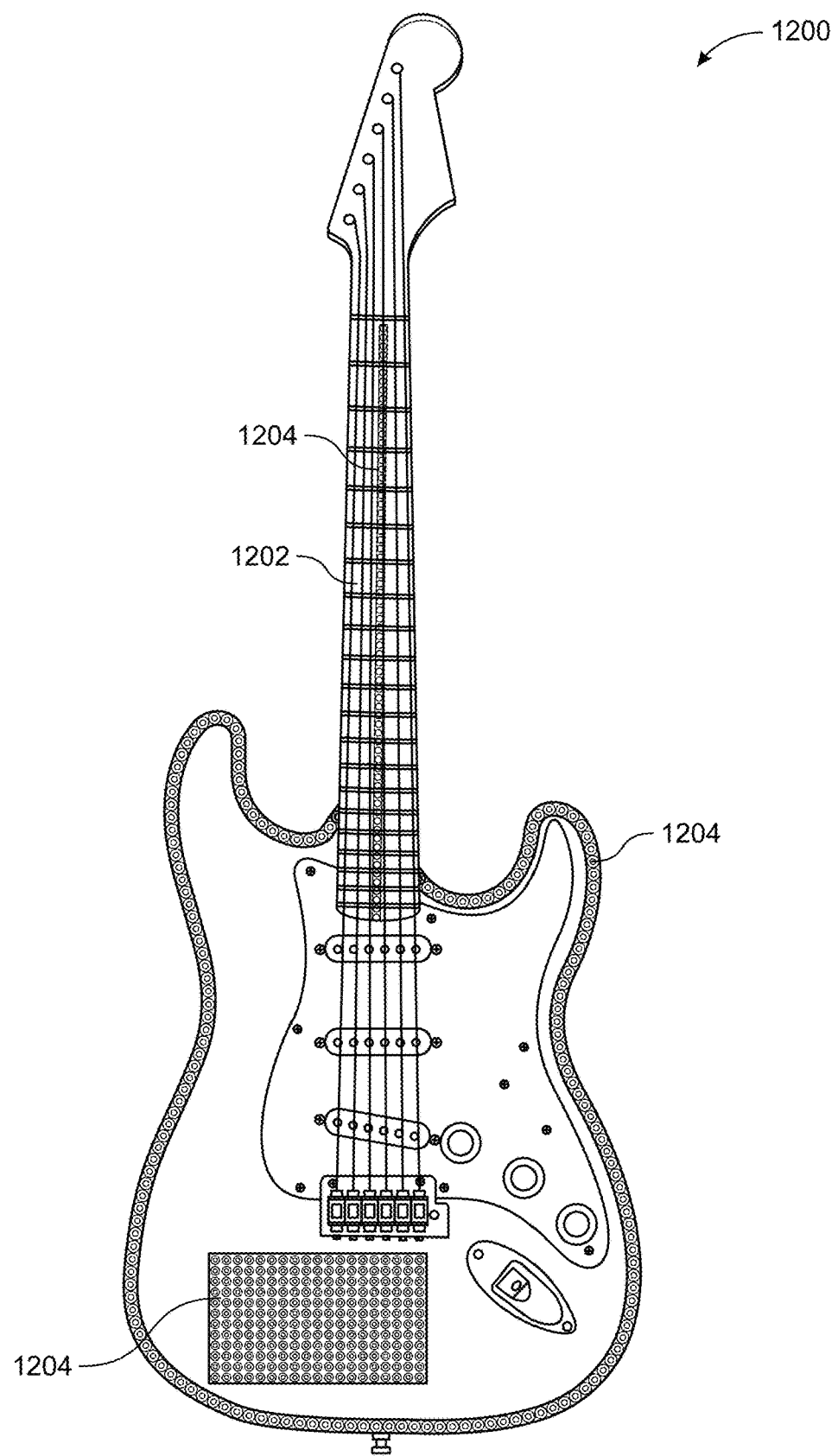

Referring to FIG. 12, illustrated is a schematic representation of electric guitar 1200 in accordance with one or more embodiments of the present disclosure. As shown, housing 1202 of electric guitar 1200 is integrated with LEDs 1204. When a string of electric guitar 1200 is plucked, an audio input signal is sent to the apparatus (such as apparatus 100, not shown herein) provided with electric guitar 1200. Based on one or more of the characteristics of the audio input signal, say the note number, one or more of the one or more parameters of LEDs 1204 change, say the position of the LED in LEDs 1204 that glows. When a music piece is played, based on various performance characteristics' mapping to various lighting parameters, LEDs 1204 glow in accordance. Although the musical instrument is being shown as an electric guitar, it may be an acoustic guitar without any limitations. Notably, one or more characteristics of the input signal of the electric guitar 1200 are mapped to the one or more parameters of LEDs 1204. The association of the one or more characteristics of the input signal to the one or more parameters is a one on one mapping. Additionally, in some examples, each characteristic of the input signal of electric guitar 1200 may be associated with more than one parameter of the LEDs 1204. Several algorithms may be employed to associate one or more characteristics of electric guitar 1200 to the one or more parameters of LEDs 1204. In an example, the controller (such as controller 104 not shown herein) is further configured to modulate the one or more parameters of the optical output in accordance with the one or more characteristics of the input signal of the electric guitar 1200. The one or more parameters of LEDs 1204 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Figure 13:
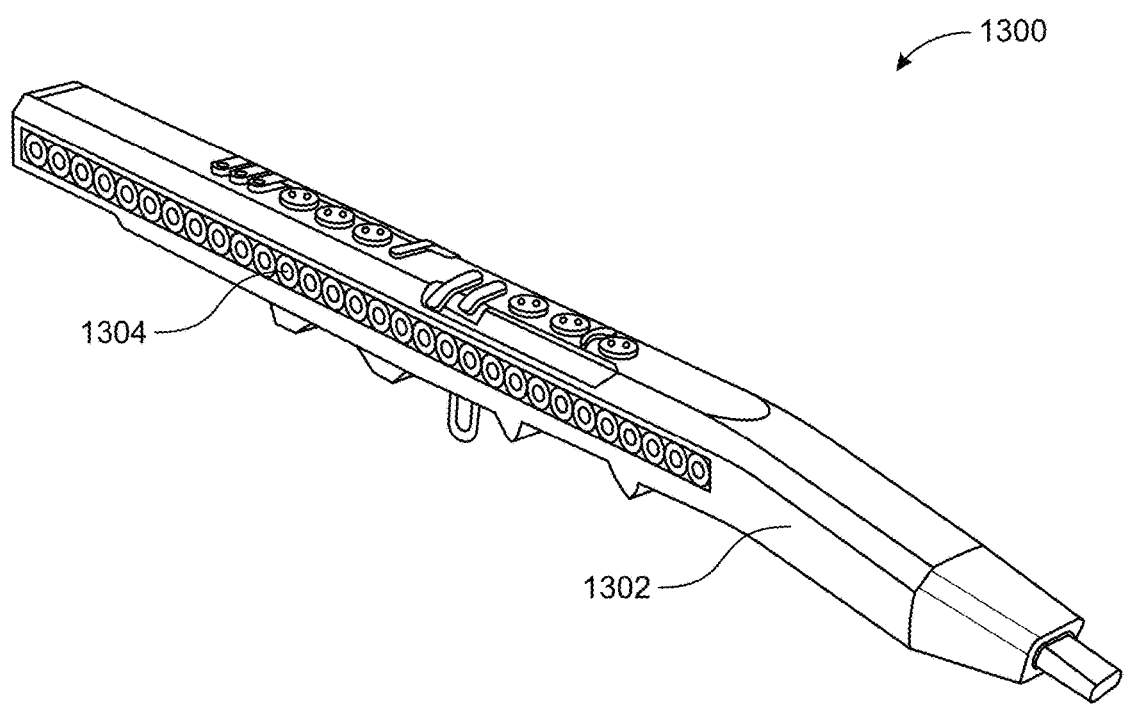

Referring to FIG. 13, illustrated is a schematic representation of electronic or traditional wind instrument 1300 in accordance with one or more embodiments of the present disclosure. As shown, body 1302 of wind instrument 1300 is integrated with LEDs 1304. When a stream of air flows through or around body 1302 of instrument 1300, an audio input signal is sent to an apparatus (such as the apparatus 100, not shown herein) provided with wind instrument 1300. Based on one or more of the characteristics of the audio input signal, say the volume of the sound, one or more parameters of the one or more LEDs 1304 change, say the brightness of the LED that glows. When a music piece is played, based on various performance characteristics' mapping to various lighting parameters, LEDs 1304 glow in accordance. Notably, one or more characteristics of the input signal of the wind instrument 1300 are mapped to the one or more parameters of LEDs 1304. The association of the one or more characteristics of the input signal to the one or more parameters is a one on one mapping. Additionally, in some examples, each characteristic of the input signal of wind instrument 1300 may be associated with more than one parameter of LEDs 1304. Several algorithms may be employed to associate one or more characteristics of wind instrument 1300 to the one or more parameters of LEDs 1304. In an example, the controller (such as controller 104 not shown herein) is further configured to modulate the one or more parameters of the optical output in accordance with the one or more characteristics of the input signal of the wind instrument 1300. The one or more parameters of LEDs 1304 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Figure 14:
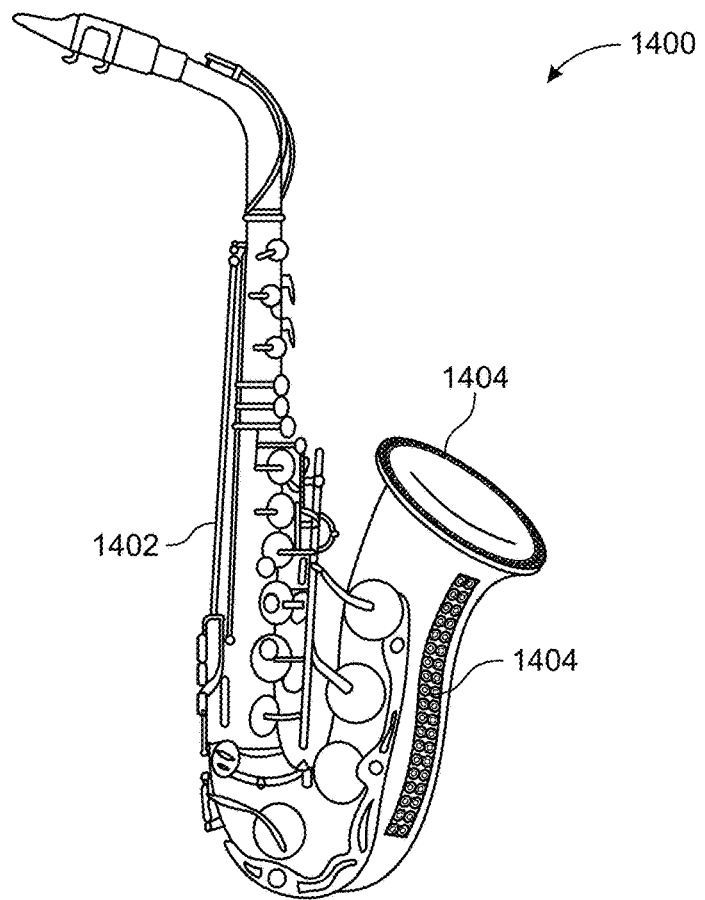

Referring to FIG. 14, illustrated is a schematic representation of saxophone 1400 in accordance with one or more embodiments of the present disclosure. As shown, body 1402 of the saxophone 1400 is integrated with LEDs 1404. When a stream of air flows through body 1402 of saxophone 1400, an audio input signal is sent to an apparatus (such as apparatus 100, not shown herein) provided with saxophone 1400. Based on one or more of the characteristics of the audio input signal, say the volume of the sound, one or more parameters of the one or more LEDs 1404 change, say the position of the LED that glows. When a music piece is played, based on various performance characteristics' mapping to various lighting parameters, LEDs 1404 glow in accordance. Notably, one or more characteristics of the input signal of saxophone 1400 are mapped to the one or more parameters of LEDs 1404. The association of the one or more characteristics of the input signal to the one or more parameters is a one on one mapping. Additionally, in some examples, each characteristic of the input signal of the saxophone 1400 may be associated with more than one parameter of LEDs 1404. Several algorithms may be employed to associate one or more characteristics of the saxophone 1400 to the one or more parameters of LEDs 1404. In an example, the controller (such as controller 104 not shown herein) is further configured to modulate the one or more parameters of the optical output in accordance with the one or more characteristics of the input signal of saxophone 1404. The one or more parameters of LEDs 1404 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Figure 15:
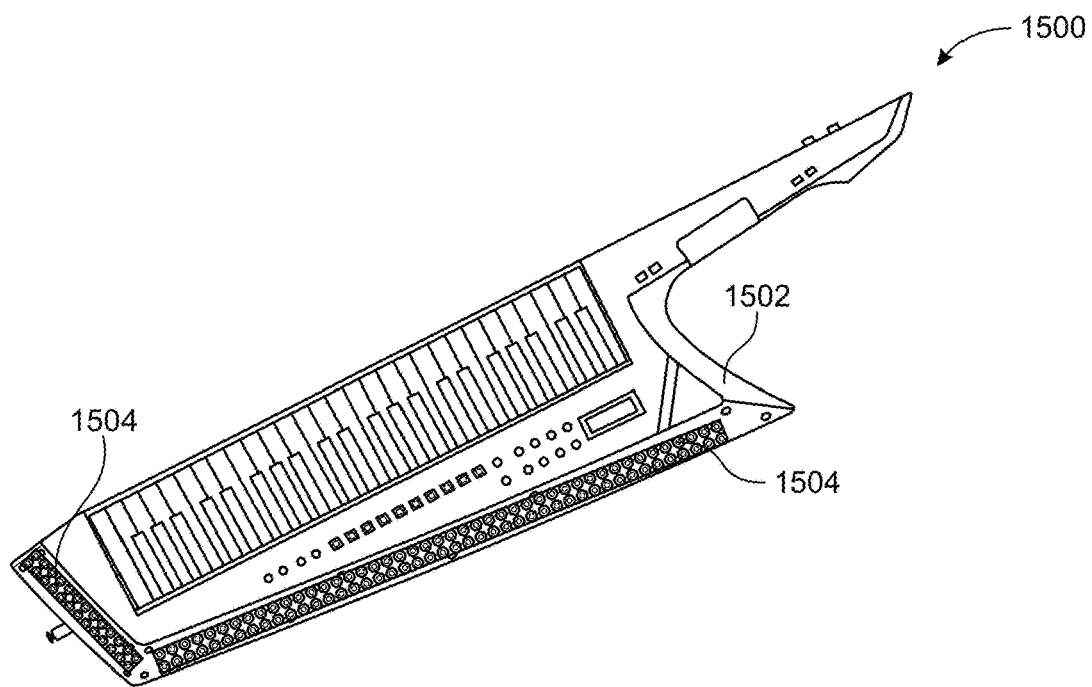

Referring to FIG. 15, illustrated is a schematic representation of keytar 1500 in accordance with one or more embodiments of the present disclosure. As shown, housing 1502 of keytar 1500 is integrated with LEDs 1504. When a key of keytar 1500 is pressed, an audio input signal is sent to an apparatus (such as the apparatus 100, not shown herein) provided with the keytar 1500. Based on one or more of the characteristics of the audio input signal, say the position of the key, one or more parameters of one or more LEDs 1504 change, say the color of the light emitted. When a music piece is played, based on various performance characteristics' mapping to various lighting parameters, LEDs 1504 glow in accordance. Notably, one or more characteristics of the input signal of keytar 1500 are mapped to the one or more parameters of LEDs 1504. The association of the one or more characteristics of the input signal to the one or more parameters is a one on one mapping. Additionally, in some examples, each characteristic of the input signal of keytar 1500 may be associated with more than one parameter of LEDs 1504. Several algorithms may be employed to associate one or more characteristics of keytar 1500 to the one or more parameters of LEDs 1504. In an example, the controller (such as controller 104 not shown herein) is further configured to modulate the one or more parameters of the optical output in accordance with the one or more characteristics of the input signal of keytar 1500. The one or more parameters of LEDs 1504 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Figure 16:
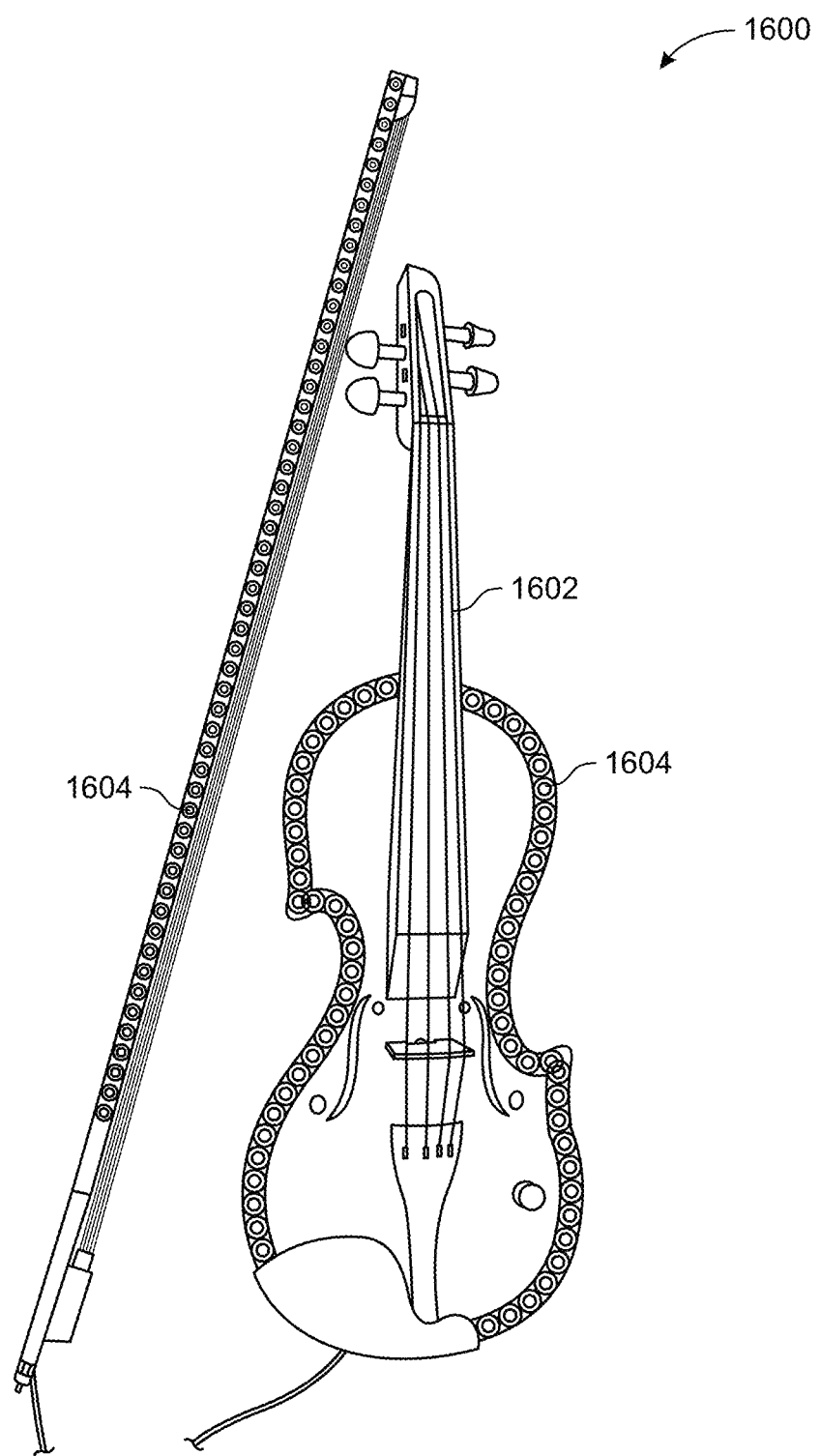

Referring to FIG. 16, illustrated a set of violin 1600 and corresponding bow in accordance with one or more embodiments of the present disclosure. As shown, body 1602 of the violin and the bow are integrated with LEDs 1604. When a string of violin 1600 is plucked, an audio input signal is sent to an apparatus (such as the apparatus 100, not shown herein) provided with the violin. Based on one or more of the characteristics of the audio input signal, say the note number, one or more parameters of one or more LEDs 1604 change, say the position of the LED that glows. When a music piece is played, based on various performance characteristics' mapping to various lighting parameters, LEDs 1604 glow in accordance. Notably, one or more characteristics of the input signal of violin 1600 are mapped to the one or more parameters of LEDs 1604. The association of the one or more characteristics of the input signal to the one or more parameters is a one on one mapping. Additionally, in some examples, each characteristic of the input signal of violin 1600 may be associated with more than one parameter of LEDs 1604. Several algorithms may be employed to associate one or more characteristics of violin 1600 to the one or more parameters of LEDs 1604. In an example, the controller (such as controller 104 not shown herein) is further configured to modulate the one or more parameters of the optical output in accordance with the one or more characteristics of the input signal of violin 1600. The one or more parameters of LEDs 1604 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Figure 17:
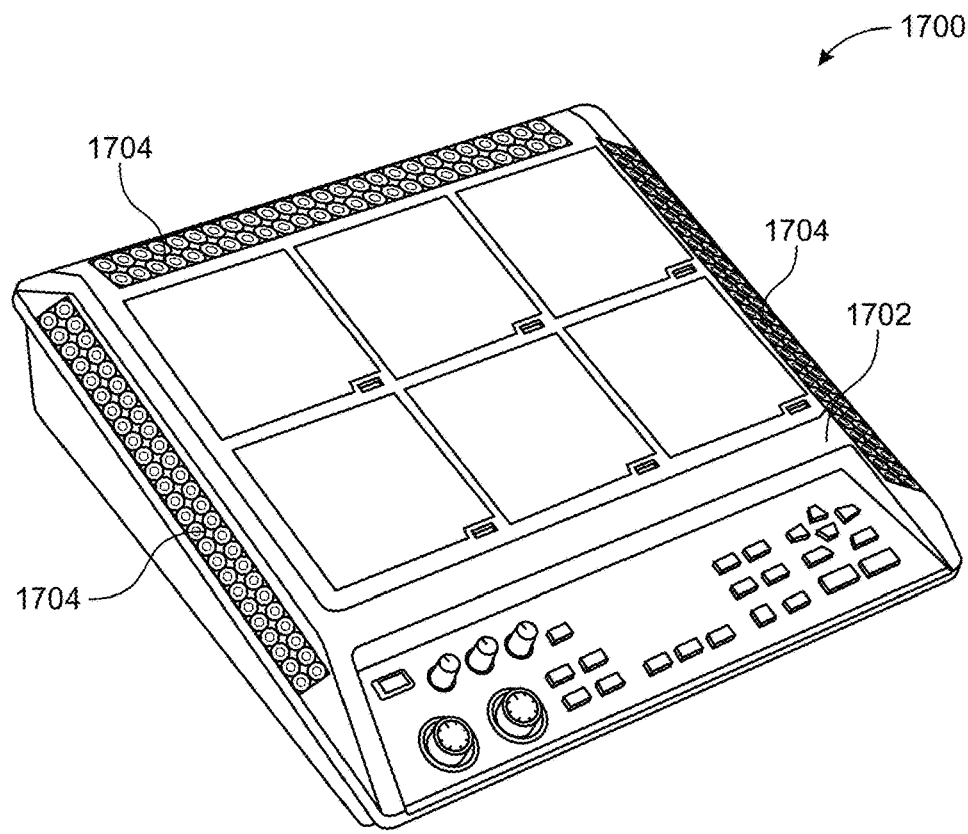

Referring to FIG. 17, illustrated is a schematic representation of drum pad controller 1700 in accordance with one or more embodiments of the present disclosure. As shown, housing 1702 of drum pad controller 1702 is integrated with LEDs 1704. When an artist beats drum pad controller 1700, an audio input signal is sent to an apparatus (such as apparatus 100, not shown herein) provided with drum pad controller 1700. Based on one or more of the characteristics of the audio input signal, say the volume of the sound produced, one or more parameters of one or more LEDs 1704 change, say the brightness of the light emitted. When a music piece is played, based on various performance characteristics' mapping to various lighting parameters, LEDs 1704 glow in accordance. Notably, one or more characteristics of the input signal of drum pad controller 1700 are mapped to the one or more parameters of LEDs 1704. The association of the one or more characteristics of the input signal to the one or more parameters is a one on one mapping. Additionally, in some examples, each characteristic of the input signal of drum pad controller 1700 may be associated with more than one parameter of LEDs 1704. Several algorithms may be employed to associate one or more characteristics of drum pad controller 1700 to one or more parameters of LEDs 1704. In an example, the controller (such as controller 104 not shown herein) is further configured to modulate the one or more parameters of the optical output in accordance with the one or more characteristics of the input signal of drum pad controller 1700. The one or more parameters of LEDs 1704 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Figure 18:
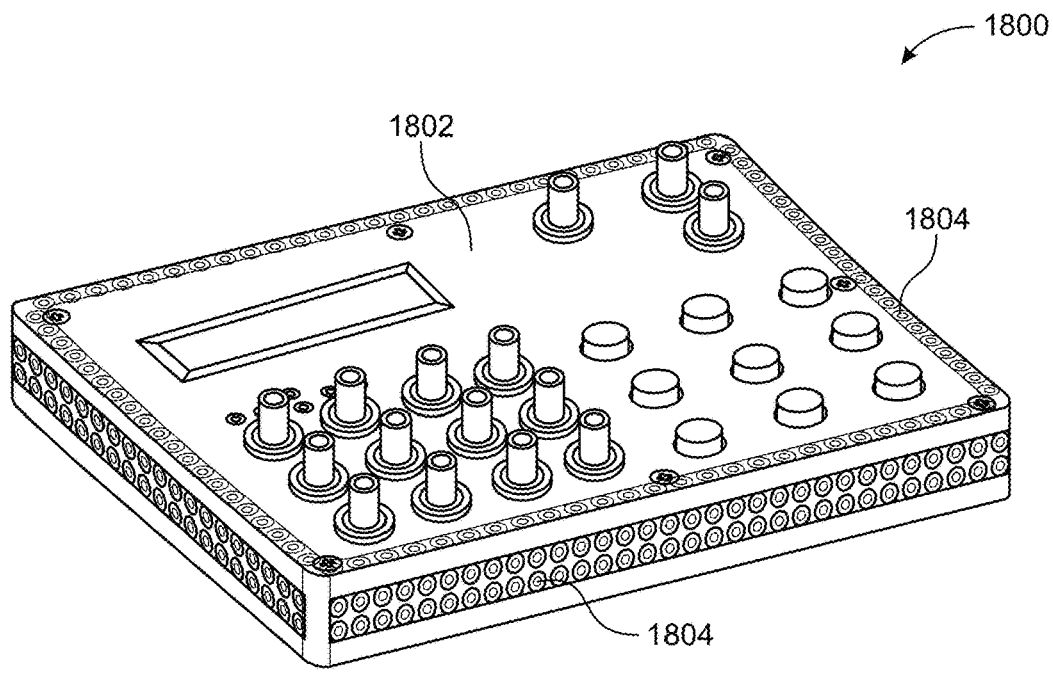
FIG. 18 is an illustration of schematic representation of a synthesizer, in accordance with one or more embodiments of the present disclosure.

Referring to FIG. 18, illustrated is synthesizer 1800, in accordance with one or more embodiments of the present disclosure. As shown, housing 1802 of synthesizer 1800 is integrated with LEDs 1804. When a sound is produced by synthesizer 1800, an audio input signal is sent to an apparatus (such as apparatus 100, not shown herein) provided with synthesizer 1800. Based on one or more of the characteristics of the audio input signal, say the volume of the sound produced, one or more parameters of one or more LEDs 1804 change, say the color of the light emitted. When a music piece is played, based on various performance characteristics' mapping to various lighting parameters, LEDs 1804 glow in accordance. Notably, one or more characteristics of the input signal of synthesizer 1800 are mapped to the one or more parameters of LEDs 1804. The association of the one or more characteristics of the input signal to the one or more parameters is a one on one mapping. Additionally, in some examples, each characteristic of the input signal of synthesizer 1800 may be associated with more than one parameter of LEDs 1804. Several algorithms may be employed to associate one or more characteristics of synthesizer 1800 to the one or more parameters of LEDs 1804. In an example, the controller (such as controller 104 not shown herein) is further configured to modulate the one or more parameters of the optical output in accordance with the one or more characteristics of the input signal of synthesizer 1800. The one or more parameters of LEDs 1804 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Figure 19:
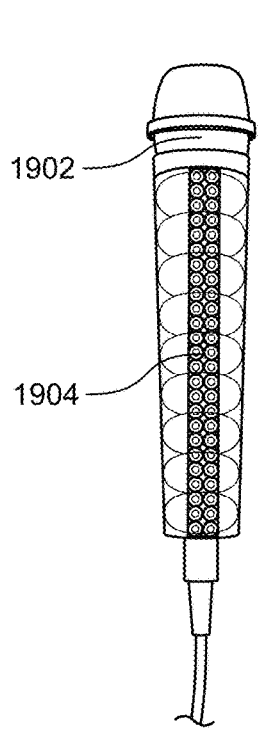
FIG. 19 is an illustration of schematic representation of a microphone, in accordance with one or more embodiments of the present disclosure.

Referring to FIG. 19, illustrated is microphone 1900, in accordance with one or more embodiments of the present disclosure. As shown, housing 1902 of microphone 1900 is integrated with LEDs 1904. When microphone 1900 receives a sound, an audio input signal is sent to an apparatus (such as the apparatus 100, not shown herein) provided with microphone 1900. Based on one or more of the characteristics of the audio input signal, say the volume of the sound produced, one or more parameters of one or more LEDs 1904 change, say the brightness of the light emitted. When a music piece is played, based on various performance characteristics' mapping to various lighting parameters, LEDs 1904 glow in accordance. Notably, one or more characteristics of the input signal of microphone 1900 are mapped to the one or more parameters of LEDs 1904. The association of the one or more characteristics of the input signal to the one or more parameters is a one on one mapping. Additionally, in some examples, each characteristic of the input signal of microphone 1900 may be associated with more than one parameter of LEDs 1904. Several algorithms may be employed to associate one or more characteristics of microphone 1900 to the one or more parameters of LEDs 1904. In an example, the controller (such as controller 104 not shown herein) is further configured to modulate the one or more parameters of the optical output in accordance with the one or more characteristics of the input signal of microphone 1900. The one or more parameters of LEDs 1904 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Figure 20:
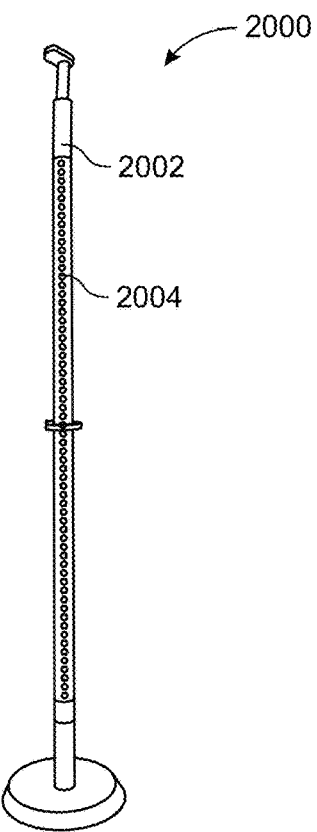
FIG. 20 is an illustration of schematic representation of a microphone stand, in accordance with one or more embodiments of the present disclosure.

Referring to FIG. 20, illustrated is schematic representation of microphone stand 2000, in accordance with one or more embodiments of the present disclosure. As shown body 2002 of microphone stand 2000 is integrated with LEDs 2004. LEDs 2004 can glow in accordance with the input signal from a microphone (like, microphone 1900) connected to or associated with the microphone stand 2000. When the corresponding microphone receives a sound, an audio input signal is sent to an apparatus (such as the apparatus 100, not shown herein) provided with microphone stand 2000. Based on one or more of the characteristics of the audio input signal, say the volume of the sound produced, one or more of parameters, one or more LEDs 2004 change, say the brightness of the light emitted. When a music piece is played, based on various performance characteristics' mapping to various lighting parameters, LEDs 2004 glow in accordance. Notably, one or more characteristics of the input signal of the microphone (not shown) associated with microphone stand 2000 are mapped to the one or more parameters of LEDs 2004. The association of the one or more characteristics of the input signal to the one or more parameters is a one on one mapping. Additionally, in some examples, each characteristic of the input signal of the microphone associated with microphone stand 2000 may be associated with more than one parameter of the LEDs 2004. Several algorithms may be employed to associate one or more characteristics of the microphone associated with the microphone stand 2000 to one or more parameters of LEDs 2004. In an example, the controller (such as controller 104 not shown herein) is further configured to modulate the one or more parameters of the optical output in accordance with the one or more characteristics of the input signal of the microphone associated with microphone stand 2000. The one or more parameters of LEDs 2004 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Figure 21:
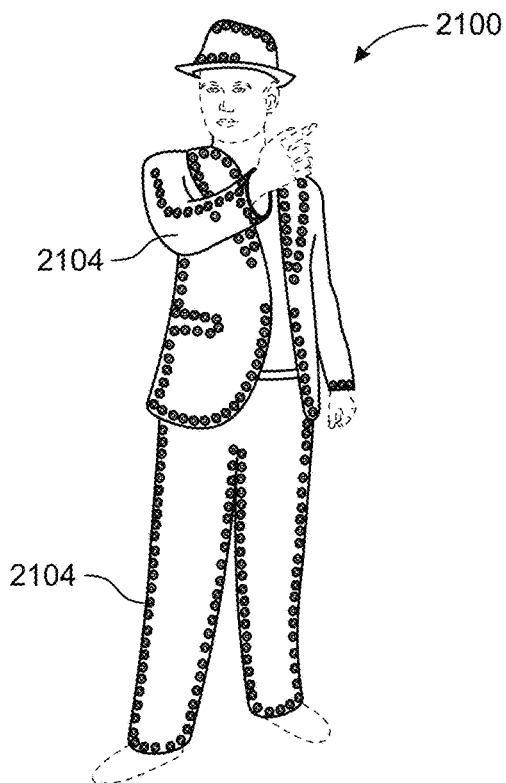
FIG. 21 is an illustration of schematic representation of a LED lighted costume, in accordance with one or more embodiments of the present disclosure.

Referring to FIG. 21, illustrated is a schematic representation of LED lighted costume 2100, in accordance with one or more embodiments of the present disclosure. As shown, costume 2100 is integrated with LEDs 2104. LEDs 2104 on costume 2100 are controlled by a lighting controller of an apparatus (such as apparatus 100, not shown herein). Based on one or more of the characteristics of the audio input signal to the apparatus, one or more parameters of one or more LEDs 2104 change, say the color of the light emitted. When a music piece is played, based on various performance characteristics' mapping to various lighting parameters, LEDs 2104 glow in accordance. The one or more parameters of LEDs 2104 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps i.e. movement of light across a space. As another example, one or more parameters are modulated to fill a space linearly, radially, spirals and other geometric shapes such as line movement, polygon movement, 3D shape movement, and so forth.

Figure 22:
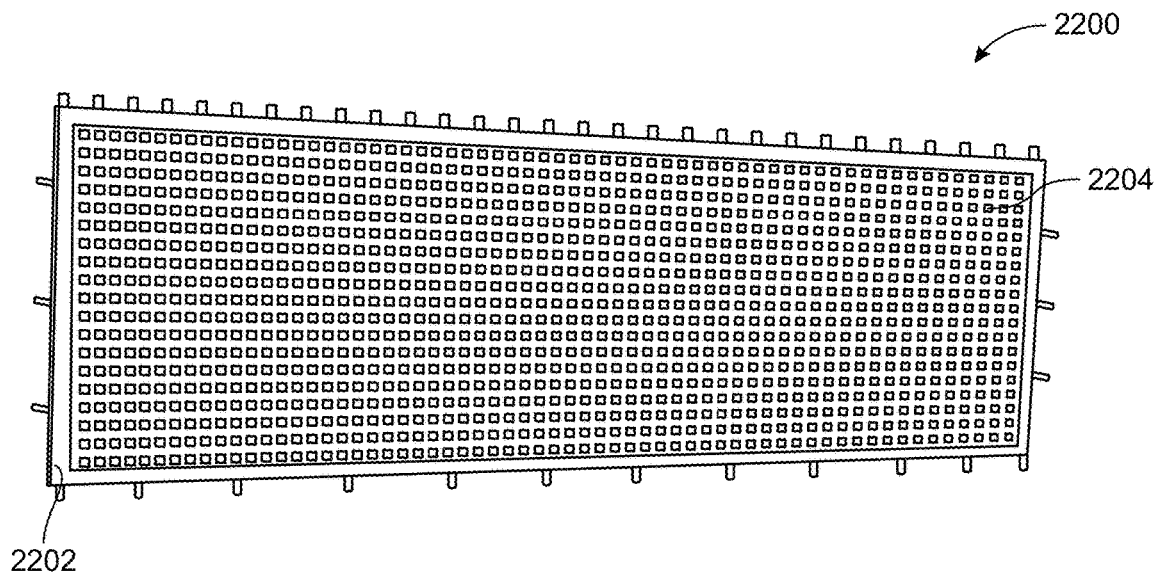
FIG. 22 is an illustration of schematic representation of a display unit, in accordance with one or more embodiments of the present disclosure.

Referring to FIG. 22, illustrated is a schematic representation of display unit 2200, in accordance with one or more embodiments of the present disclosure. As shown, body 2202 of display unit 2200 is integrated with LEDs 2204. LEDs 2204 on display unit 2200 are controlled by a lighting controller of an apparatus (such as apparatus 100, not shown herein). Based on one or more of the characteristics of the audio input signal to the apparatus, one or more parameters of one or more LEDs 2204 change, say the brightness of the light emitted. When a music piece is played, based on various performance characteristics' mapping to various lighting parameters, LEDs 2204 glow in accordance. The one or more parameters of LEDs 2204 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Figure 23:
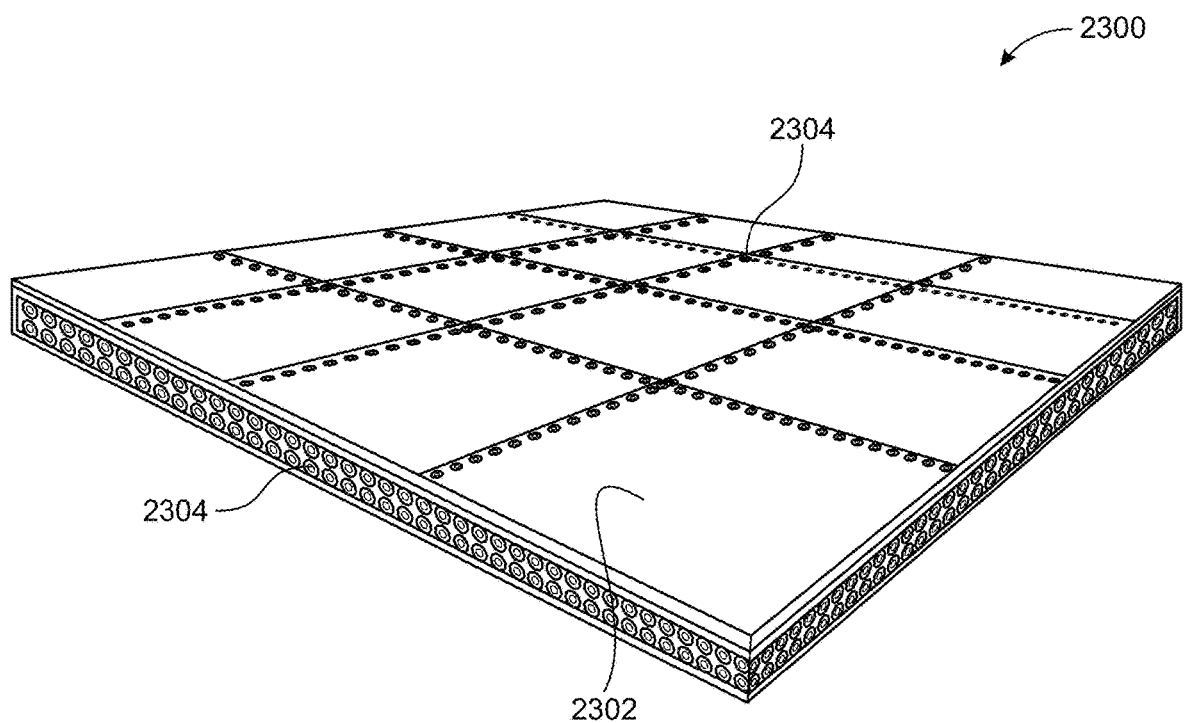
FIG. 23 an illustration of schematic representation of a stage platform, in accordance with one or more embodiments of the present disclosure.

Referring to FIG. 23, illustrated is a schematic representation of stage platform 2300, in accordance with one or more embodiments of the present disclosure. As shown, body 2302 of stage platform 2300 is integrated with LEDs 2304. LEDs 2304 on stage platform 2300 are controlled by a lighting controller of an apparatus (such as apparatus 100, not shown herein). Based on one or more of the characteristics of the audio input signal to the apparatus, one or more parameters of the one or more LEDs change, say the color of the light emitted. When a music piece is played, based on various performance characteristics' mapping to various lighting parameters, LEDs 2304 glow in accordance. The one or more parameters of LEDs 2304 can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Figures 24A, 24B:
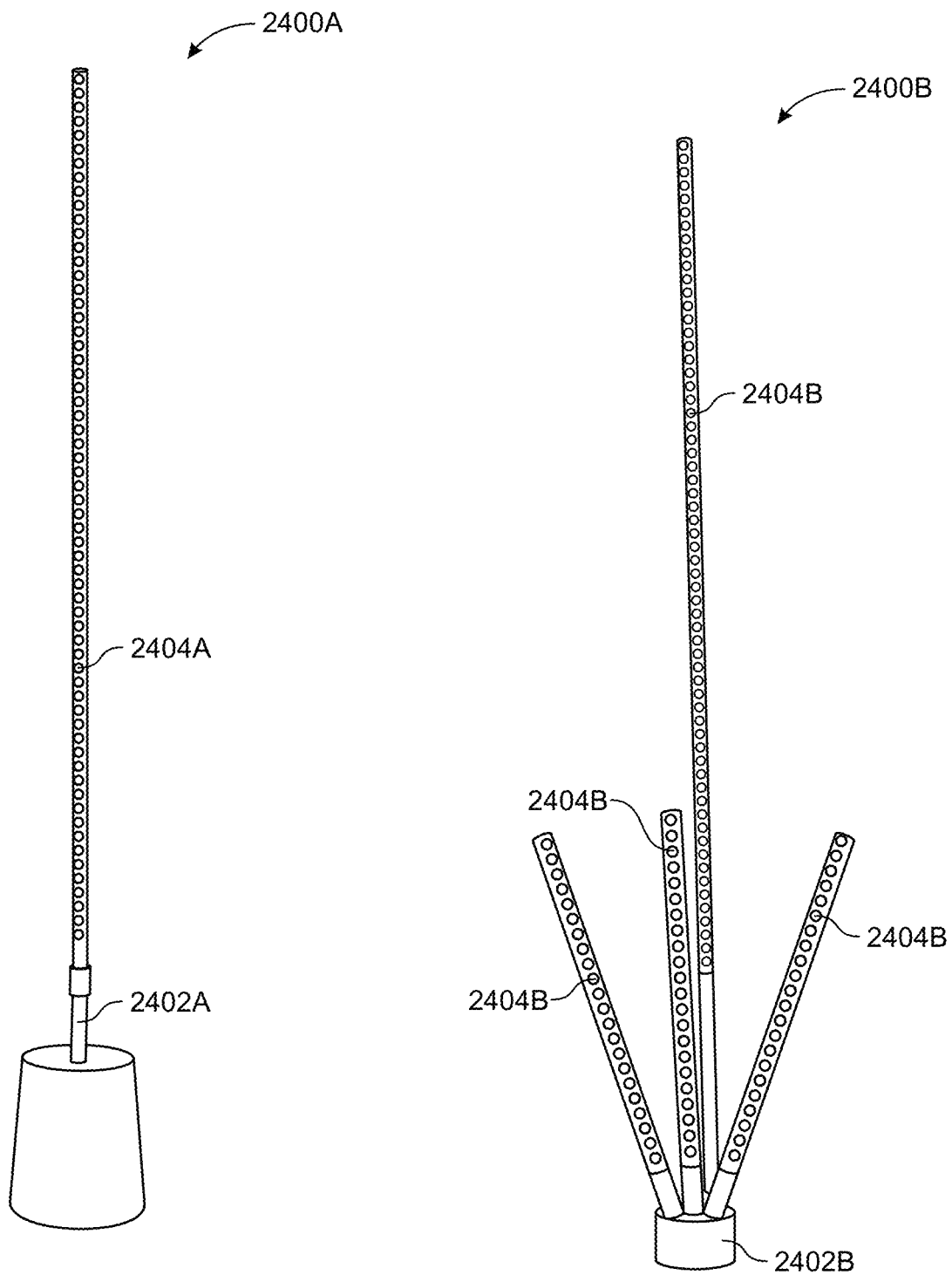
FIGS. 24A-24B are illustrations of schematic representation of LED bar controlled by an audio source, in accordance with one or more embodiments of the present disclosure.

Referring to FIG. 24A illustrated is a schematic representation of LED bar 2400A controlled by an audio source, in accordance with an embodiment of the present disclosure. As shown, LED bar 2400A includes base 2402A provided with LED strip 2404A in the form of elongated bar extended therefrom. Herein, based on one or more of the characteristics of the audio input signal from the audio source, one or more parameters of the one or more LEDs in LED strip 2404A change, say the color of the light emitted. When a music piece is played, based on various performance characteristics' mapping to various lighting parameters, LED strip 2404A glow in accordance. The one or more parameters of LED strip 2404A can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

Referring to FIG. 24B, illustrated is a schematic representation of LED bar 2400B controlled by an audio source, in accordance with one or more embodiments of the present disclosure. As shown, LED bar 2400B includes base 2402B provided with a number of LED strips 2404B in the form of elongated bars extended therefrom, that may vary in lengths. Herein, based on one or more of the characteristics of the audio input signal from the audio source, one or more parameters of one or more LEDs 2404B change, say the color of the light emitted. When a music piece is played, based on various performance characteristics mapping to various lighting parameters, LED strips 2404B glow in accordance. The one or more parameters of LED strips 2404B can be modulated in numeral ways to create appealing visual effects. As an example, one or more parameters can be modulated to create a chasing rainbow effect where a rainbow of color moves across a room. Herein parameters can include speed of effect, width of effect, color amplitudes and saturation. As an example, one or more parameters can be modulated to create a water effect where swirling and movement of blue and white colors is created to give the effect of water color and movement. Parameters may include rate of change, color intensities, color change over time, scale of the effect (how it is displayed across a space is related to numbers of lights and positions and pitch of fixtures.). As another example, one or more parameters can be modulated to create logo effect by taking an image and displaying it in lights. Here parameters may include movement, stretch and distortion, keystone adjustments, rotations, speeds, accelerations etc. As another example, one or more parameters can be modulated sunrise effect, i.e., a slower effect showing the passage of time and color of sunlight and sunrise and sunset. As another example, one or more parameters can be modulated to create an explosion effect. As another example, one or more parameters are modulated to create spatial strobes with movement of color and light. Here, parameters may include rotation, heavy beats that propagate through a space via light and color. As another example, one or more parameters are modulated to create color wash effect with variance in color over time. Here, parameters include speed and color choices. As another example, one or more parameters are modulated to create sweeps, i.e., movement of light across a space. As another example, one or more parameters are modulated to fill a space linearly, radially, spirals and other geometric shapes such as line movement, polygon movement, 3D shape movement, and so forth.

It may be appreciated that in the instruments and devices as shown in FIGS. 10-24B, the position of corresponding LEDs, LED panels and LED strips may be generally based on shape of respective housings or bodies, for example along peripheries of housings and the like. The given illustrations of the instruments and devices with the positions of corresponding LEDs, LED panels and LED strips are exemplary only and shall not be construed as limiting to the present disclosure in any manner.

The devices, systems and apparatuses as disclosed above are implanted for generating audio synchronized optical output. These devices, systems and apparatuses generate lighting output in response to an audio in an environment, thereby creating a synchronized harmony between one or more optical sources employed in the environment and the audio by mapping one or more properties of the input signal with lighting output parameters. Such devices, systems and apparatuses may be employed for generating audio synchronized optical output in an entertainment venue.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. An apparatus for generating audio and/or performance synchronized optical output, the apparatus comprising:
an input channel communicatively connected to at least one of a plurality of data capturing sensors for capturing data corresponding to a performance of a user, wherein the input channel is configured to receive an input signal from an audio source and the data capturing sensors, wherein the input signal comprises aural data, visual data and peripheral data, wherein the input channel is integrated within the apparatus;
a user interface configured to receive one or more messages, a voice input, and designated keywords from the user, wherein the designated keywords comprise words sung during a performance; and
a controller integrated within the apparatus, the controller configured to:
receive the input signal from the input channel;
analyze the input signal to determine one or more characteristics of the input signal;
associate the determined one or more characteristics of the input signal to one or more parameters of an optical output from an optical source;
receive the one or more messages, the voice input, or the designated keywords from the user interface;
modulate, vary or transform the one or more parameters of the optical output in reaction to the one or more characteristics of the input signal;
further modulate, vary or transform the one or more parameters of the optical output based on the one or more of messages, the voice input, and designated keywords received indicating changes in parameters of the optical source;
generate lighting control data based on the modulated, varied or transformed one or more parameters of the optical output; and
transmit the resulting lighting control data to the optical source such that the optical source illuminates with either an adjustable degree of randomness or variation or both randomness and variation in reaction to the input signal including the performance of the user in real-time.

2. The apparatus of claim 1, wherein the apparatus is a musical instrument.

3. The apparatus of claim 2, wherein the one or more characteristics of the input signal comprises one or more of: magnitude, phase, frequency, average intensity, a channel of the input signal, a playing speed of associated musical instrument, and a tempo of associated musical instrument.

4. The apparatus of claim 1, wherein the optical source comprises one or more of: light emitting diodes, LASERs, light guides, and optical fibers.

5. The apparatus of claim 1, wherein the one or more parameters of the optical source comprises at least one of: color, hue, type of lighting pattern, speed of lighting pattern, type of wave generated, position of optical sources fixtures, fixture pan, and fixture tilt.

6. The apparatus of claim 1, wherein the controller is further configured to transmit the lighting control data to external lighting devices and visual effects devices, and wherein the external visual devices comprise at least one of: fog machines, haze machines, lasers, gas cannons, air cannons, moving platforms, moving lights, water sprinklers, aroma diffusers, and display units.

7. The apparatus of claim 1, wherein the controller is further configured to randomly generate the one or more parameters of the optical output.

8. A musical instrument for generating audio and/or performance synchronized optical output, the musical instrument comprising:
an optical source integrated in a housing of the musical instrument, wherein the optical source is disposed on at least one surface of the musical instrument;
an input channel communicatively connected to at least one of a plurality of data capturing sensors for capturing data corresponding to a performance of a user, wherein the input channel is configured to receive an input signal from an audio source and the data capturing sensors, wherein the input signal comprises aural data, visual data and peripheral data, wherein the input channel is integrated within the musical instrument;
a user interface configured to receive one or more messages, a voice input, and designated keywords from the user, wherein the designated keywords comprise words sung during a performance; and
a controller integrated in the housing of the musical instrument, the controller configured to:
receive the input signal from the input channel;
analyze the input signal to determine one or more characteristics of the input signal;
associate the determined one or more characteristics of the input signal to one or more parameters of an optical output from an optical source;
receive the one or more messages or the designated keywords from the user interface;
modulate, vary or transform the one or more parameters of the optical output in reaction to the one or more characteristics of the input signal;
further modulate, vary or transform the one or more parameters of the optical output based on the one or more of messages, the voice input, and designated keywords received indicating changes in parameters of the optical source;
generate lighting control data based on the modulated, varied or transformed one or more parameters of the optical output; and transmit the lighting control data to the optical source such that the optical source illuminates with randomness in reaction to the input signal including the performance of the user in real-time.

9. The musical instrument of claim 8, wherein the one or more characteristics of the input signal comprises one or more of: magnitude, phase, frequency, average intensity, a channel of the input signal, a playing speed of associated musical instrument, and a tempo of associated musical instrument.

10. The musical instrument of claim 8, wherein the optical source comprises one or more of: light emitting diodes, LASERs, light guides, and optical fibers.

11. The musical instrument of claim 8, wherein the one or more parameters of the optical output comprises at least one of: color, hue, type of lighting pattern, speed of lighting pattern, type of wave generated, position of optical sources fixtures, fixture pan, and fixture tilt.

12. The musical instrument of claim 8, wherein the controller is further configured to transmit the lighting control data to external lighting devices and visual effects devices, and wherein the external lighting devices and visual effects devices comprise at least one of: fog machines, haze machines, lasers, gas cannons, air cannons, moving platforms, moving lights, water sprinklers, aroma diffusers, and display units.

13. The apparatus of claim 2, wherein the musical instrument comprises one of a drum, a keyboard, keypad, a Musical Instrument Digital Interface (MIDI), a saxophone, a violin, a drum pad, an electronic wind instrument, a Keytar, and a piano, wherein the musical instrument comprises a housing having the optical output, and wherein the optical source comprises an array of Light Emitting Diodes (LEDs).

14. The apparatus of claim 1, wherein the optical source comprises a Light Emitting Diode (LED) bar.

15. The musical instrument of claim 8, wherein the musical instrument comprises one of a drum, a keyboard, keypad, a Musical Instrument Digital Interface (MIDI), a saxophone, a violin, a drum pad, an electronic wind instrument, a Keytar, and a piano, wherein the musical instrument comprises a housing having the optical output, and wherein the optical source comprises an array of Light Emitting Diodes (LEDs).

16. The musical instrument of claim 8, wherein the musical instrument, the optical source and the audio source are connected wirelessly.

17. A method of providing a musical instrument for generating audio and/or performance synchronized optical output, the method comprising the steps of:
   providing an optical source integrated in a housing of the musical instrument, wherein the optical source is disposed on at least one surface of the musical instrument;
   providing an input channel communicatively connected to one of a plurality of data capturing sensors for capturing data corresponding to a performance of a user, the input channel configured to receive an input signal from an audio source and the data capturing sensors, the input signal comprising aural data, visual data and peripheral data, the input channel being integrated within the musical instrument;
   providing a user interface for receiving one or more messages, a voice input, and designated keywords from the user, the designated keywords comprising words sung during a performance, and providing a controller integrated in the housing of the musical instrument for:
   receiving the input signal from the input channel;
   analyzing the input signal to determine one or more characteristics of the input signal;
   associating the determined one or more characteristics of the input signal to one or more parameters of an optical output from an optical source;
   receiving the one or more messages or the relevant keywords from the user interface;
   modulating, varying or transforming the one or more parameters of the optical output in reaction to the one or more characteristics of the input signal; further modulating, varying or transforming the one or more parameters of the optical output based on the one or more of messages, the voice input, and designated keywords received indicating changes in parameters of the optical source;
   generating lighting control data based on the modulated, varied or transforming one or more parameters of the optical output; and
   transmitting the lighting control data to the optical source such that the optical source illuminates with randomness in reaction to the input signal including the performance of the user in real-time.

* * * * *